(12) United States Patent
Fukuda et al.

(10) Patent No.: US 10,302,192 B2
(45) Date of Patent: May 28, 2019

(54) METHOD AND DEVICE FOR CONTROLLING AUTOMATIC TRANSMISSION

(71) Applicant: Mazda Motor Corporation, Aki-gun, Hiroshima (JP)

(72) Inventors: Yutaro Fukuda, Hiroshima (JP);
Manabu Sasahara, Hiroshima (JP);
Tadashi Saito, Hiroshima (JP);
Tomohiro Kubo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 95 days.

(21) Appl. No.: 15/595,869

(22) Filed: May 15, 2017

(65) Prior Publication Data
US 2017/0335962 A1  Nov. 23, 2017

(30) Foreign Application Priority Data
May 19, 2016  (JP) .................................. 2016-100141

(51) Int. Cl.
*F16D 25/06*  (2006.01)
*F16H 63/30*  (2006.01)
(Continued)

(52) U.S. Cl.
CPC ......... *F16H 63/3026* (2013.01); *F16D 25/06* (2013.01); *F16D 25/062* (2013.01);
(Continued)

(58) Field of Classification Search
CPC ............... F16H 31/0021; F16H 63/303; F16H 63/3026; F16D 25/10; F16D 25/14; F16D 25/06; F16D 25/062; F16D 25/063
(Continued)

(56) References Cited

U.S. PATENT DOCUMENTS 6,599,215 B2 *  7/2003  Takatori ................ F16H 61/061
475/120
7,001,299 B2 *  2/2006  Takagi .................. F16H 61/061
192/3.57
(Continued)

FOREIGN PATENT DOCUMENTS

CN       1873248 A    12/2006
CN     102164797 A     8/2011
(Continued)

*Primary Examiner* — Leslie A Nicholson, III
(74) *Attorney, Agent, or Firm* — Alleman Hall Creasman & Tuttle LLP

(57) ABSTRACT

A method of controlling an automatic transmission is provided. The automatic transmission includes first and second frictional engageable elements and a hydraulic mechanism. The method includes controlling a first hydraulic pressure control valve of the first element to adjust hydraulic pressure to a given value in a first period in response to the gear shift command and increase the hydraulic pressure until first friction plates engaged in a second period, and a second hydraulic pressure control valve of the second element to pre-charge in response to the gear shift command, maintain the hydraulic pressure at a lower value than a highest target value immediately after the pre-charging, and increase the hydraulic pressure until second friction plates engaged immediately after the maintaining the pressure, a time length of the first period being shorter than a time length between a start of the pre-charging and a start of the increasing the pressure.

20 Claims, 17 Drawing Sheets

(51) Int. Cl.
*F16D 25/062* (2006.01)
*F16D 25/063* (2006.01)
*F16D 25/0638* (2006.01)
*F16D 25/10* (2006.01)
*F16D 48/02* (2006.01)
*F16H 61/00* (2006.01)
*F16H 61/30* (2006.01)
*F16H 61/06* (2006.01)
*F16H 3/66* (2006.01)

(52) U.S. Cl.
CPC ....... *F16D 25/063* (2013.01); *F16D 25/0638* (2013.01); *F16D 25/10* (2013.01); *F16D 25/14* (2013.01); *F16H 61/0021* (2013.01); *F16H 61/06* (2013.01); *F16H 61/30* (2013.01); *F16H 3/66* (2013.01); *F16H 2061/062* (2013.01); *F16H 2063/303* (2013.01); *F16H 2200/006* (2013.01); *F16H 2200/2012* (2013.01); *F16H 2200/2043* (2013.01)

(58) Field of Classification Search
USPC .......................................................... 475/127
See application file for complete search history.

(56) References Cited

U.S. PATENT DOCUMENTS

| | | | | |
|---|---|---|---|---|
| 7,008,344 | B2* | 3/2006 | Aikawa | F16H 61/061 |
| | | | | 192/48.609 |
| 7,108,632 | B2* | 9/2006 | Takagi | F16H 61/061 |
| | | | | 475/127 |
| 7,563,189 | B2* | 7/2009 | Inuta | F16H 61/0437 |
| | | | | 475/116 |
| 9,062,760 | B2* | 6/2015 | Kamada | F16H 61/061 |
| 9,234,577 | B2* | 1/2016 | Yamada | F16H 61/0021 |
| 9,791,043 | B2* | 10/2017 | Nakashima | F16F 15/1478 |
| 10,014,853 | B1* | 7/2018 | Yang | H03K 17/6871 |
| 2006/0272919 | A1 | 12/2006 | Kawamoto et al. | |
| 2010/0173745 | A1 | 7/2010 | Hase et al. | |
| 2011/0246009 | A1 | 10/2011 | Hase et al. | |
| 2011/0263381 | A1 | 10/2011 | Katou | |
| 2012/0149519 | A1* | 6/2012 | Meyer | F16D 25/0638 |
| | | | | 475/116 |
| 2012/0202647 | A1 | 8/2012 | Suzuki et al. | |
| 2015/0217773 | A1* | 8/2015 | Nakano | B60W 10/06 |
| | | | | 477/107 |
| 2016/0033032 | A1* | 2/2016 | Takagi | F16H 61/0031 |
| | | | | 475/117 |
| 2017/0241546 | A1* | 8/2017 | Sasahara | F16D 13/52 |
| 2017/0284424 | A1* | 10/2017 | Kawaura | F15B 1/024 |
| 2017/0335951 | A1* | 11/2017 | Fukuda | F16H 61/36 |
| 2017/0335952 | A1* | 11/2017 | Fukuda | F16H 61/0206 |
| 2017/0335953 | A1* | 11/2017 | Fukuda | F16D 25/0638 |
| 2017/0335963 | A1* | 11/2017 | Fukuda | F16H 61/2807 |
| 2018/0058604 | A1* | 3/2018 | Noda | B60K 17/046 |

FOREIGN PATENT DOCUMENTS

| | | |
|---|---|---|
| CN | 102235486 A | 11/2011 |
| CN | 102628509 A | 8/2012 |
| CN | 102639895 A | 8/2012 |
| CN | 103477127 A | 12/2013 |
| CN | 104412009 A | 3/2015 |
| JP | S63045249 U | 3/1988 |
| JP | H04069414 A | 3/1992 |
| JP | 2001336621 A | 12/2001 |
| JP | 2006071048 A | 3/2006 |
| JP | 2008249009 A | 10/2008 |
| JP | 2011218835 A | 11/2011 |
| WO | 2011073000 A1 | 6/2011 |
| WO | 2012144207 A1 | 10/2012 |
| WO | 2013178900 A1 | 12/2013 |

* cited by examiner

|  | CL1 (31) | CL2 (32) | CL3 (33) | BR1 (21) | BR2 (22) |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

METHOD AND DEVICE FOR CONTROLLING AUTOMATIC TRANSMISSION

BACKGROUND

The present invention relates to a method and device for controlling an automatic transmission, and particularly relates to a method and device for controlling an automatic transmission mounted on a vehicle.

Automatic transmissions mounted on vehicles, such as automobiles, include a torque converter and a transmission gear mechanism, and automatically perform a gear shift operation by suitably setting operating states of a plurality of frictional engageable elements, such as clutches and brakes, (i.e., by selecting a suitable drive force transmitting path), according to a driving condition of the vehicle.

The gear control of such an automatic transmission is required to reduce an engaging shock when switching the operating states of the frictional engageable elements from disengaged states to engaged states, and shorten time for completing the engagement after a gear shift command is issued. For example, WO2012/144207A1 discloses a method for executing a pre-charging process when supplying hydraulic pressure to a frictional engageable element to engage the frictional engageable element. This pre-charging process quickly fills hydraulic oil in an oil path leading to the frictional engageable element from a hydraulic pressure control valve that controls the oil supply, and in a hydraulic pressure chamber of the frictional engageable element.

The pre-charging process is executed by a sharp increase of hydraulic pressure to a given value in response to the gear shift command, maintaining of the increased pressure for a given period of time, and a sharp drop of the hydraulic pressure thereafter.

The method of WO2012/144207A1 requires flowing hydraulic oil at a high flow rate (e.g., at the pre-charged hydraulic pressure) in order to shorten the time of the engagement control, while reducing the flow rate of hydraulic oil (drop the hydraulic pressure) immediately before the completion of one stroke of a piston in order to reduce an engaging shock. In this case, a fine flow rate control is required and a hydraulic pressure control tends to become complex. Therefore, inconveniences of the engagement control being time consuming and responses of the frictional engageable elements becoming slower, arise. The slower responses of the frictional engageable elements become significantly inconvenient when attempting to further shorten the gear shifting time.

The control employing the pre-charging in the engaging operation also requires constant learning of the pre-charging time and feedbacks. For this reason, the control may become complex.

Additionally, reductions in the manufacturing cost and size of the automatic transmission are required.

SUMMARY

The present invention is made in view of the above issues and aims to provide a method and device for controlling an automatic transmission, which reduce an engaging shock, shorten an engagement control time, simplify the control, and achieve reductions in manufacturing cost and size of the automatic transmission.

According to one aspect of the present invention, a method of controlling an automatic transmission having the following structure is provided.

The automatic transmission that is the control target includes a first frictional engageable element, a second frictional engageable element, and a hydraulic mechanism.

The first frictional engageable element includes a first piston having a first surface and a second surface opposite from each other in axial directions of the first piston, and movable in the axial directions, a plurality of first friction plates disposed on the first surface side of the first piston, a first engaging hydraulic pressure chamber for applying hydraulic pressure to the second surface of the first piston and directing the first piston to an engaging position to push the first friction plates to be engaged with each other in an engaged state, and a first disengaging hydraulic pressure chamber for applying hydraulic pressure to the first surface of the first piston and directing the first piston to a disengaging position to cause the first friction plates to be in a disengaged state.

The second frictional engageable element includes a second piston having a third surface and a fourth surface opposite from each other in axial directions of the second piston, and movable in the axial directions, a plurality of second friction plates disposed on the third surface side of the second piston, and a second engaging hydraulic pressure chamber for applying hydraulic pressure to the fourth surface of the second piston and directing the second piston to an engaging position to push the second friction plates to be engaged with each other.

The hydraulic mechanism includes a first hydraulic pressure control valve having an output port of hydraulic pressure, and for supplying and discharging hydraulic pressure to and from the first engaging hydraulic pressure chamber and the first disengaging hydraulic pressure chamber, a first oil path communicating the output port of the first hydraulic pressure control valve with the first engaging hydraulic pressure chamber, a second oil path communicating the output port with the first disengaging hydraulic pressure chamber, a second hydraulic pressure control valve having an output port of hydraulic pressure, and for selectively supplying and discharging hydraulic pressure to and from the second engaging hydraulic pressure chamber, and a third oil path communicating the output port of the second hydraulic pressure control valve with the second engaging hydraulic pressure chamber.

In the first frictional engageable element of the automatic transmission, the second surface has a larger area for receiving hydraulic pressure than an area of the first surface for receiving hydraulic pressure.

The method of controlling the automatic transmission includes controlling the first friction plates to change from the disengaged state to the engaged state in response to a gear shift command. The controlling the first friction plates includes controlling the first hydraulic pressure control valve to adjust the hydraulic pressure to a given value in a first period in response to the gear shift command, and increase the hydraulic pressure until the first friction plates reach the engaged state in a second period directly following the first period.

Further, the method of controlling the automatic transmission includes controlling the second friction plates to change from the disengaged state to the engaged state in response to a gear shift command. The controlling the second friction plates includes controlling the second hydraulic pressure control valve to pre-charge, maintain the hydraulic pressure at a low value, and increase the hydraulic pressure. The pre-charging is performed in response to the gear shift command by supplying hydraulic pressure at a highest target value.

Here, "pre-charging" is executed by a sharp increase of hydraulic pressure to a given pressure in response to the gear shift command, maintaining of the increased pressure for a given period of time, and then a sharp drop of the hydraulic pressure. The "pre-charging" is for, when supplying hydraulic oil for engaging the second frictional engageable element, filling the third oil path and the second engaging hydraulic pressure chamber with hydraulic oil.

The maintaining of the hydraulic pressure at the low value is executed immediately after the pre-charging and is for maintaining the hydraulic pressure of the second hydraulic pressure control valve (instructing the hydraulic pressure control valve to keep the hydraulic pressure) lower than the highest target value in the pre-charging (the hydraulic pressure before the pressure drop in the pre-charging). The increasing the hydraulic pressure is executed immediately after the maintaining the low hydraulic pressure and is for increasing the hydraulic pressure of the second hydraulic pressure control valve until the second friction plates reach the engaged state.

In the control method, a time length of the first period is shorter than a time length between a start of the pre-charging the second engaging hydraulic pressure chamber and a start of the increasing the hydraulic pressure.

Here, the instruction hydraulic pressures to the first and second hydraulic pressure control valves may vary in a certain manner. Thus, for example, in the controlling the first hydraulic pressure control valve, each of the hydraulic pressure at the given value in the first period and the hydraulic pressure in the second period is expressed by a regression line (linear regression line, curved regression line).

Note that "in response to the gear shift command" means "immediately after the issuance of the gear shift command." This means for the control of the first frictional engageable element that another process (e.g., the pre-charging) does not intervene between the issuance of the gear shift command and the start timing of the first period. Also, this means for the control of the second frictional engageable element that the pre-charging is executed "immediately after the issuance of the gear shift command."

According to the control method, in the controlling the first friction plates to change from the disengaged state to the engaged state, the first hydraulic pressure control valve is instructed to adjust the hydraulic pressure to the given value in the first period in response to the gear shift command. In other words, the instruction to adjust the hydraulic pressure to the given value is outputted to the first hydraulic pressure control valve in the first period and "the pre-charging" is not provided in the method. Therefore, according to the control method, an engagement control time is shortened and the control is simplified.

According to the control method, an engaging shock is reduced when switching the operating state of the first frictional engageable element from the disengaged state to the engaged state, and the time for completing the engagement after the gear shift command is issued is shortened. These shock reduction and shortened time are achieved by the following structure.

According to the control method, in the engaging operation of the first frictional engageable element, the hydraulic pressure is supplied from the output port of the first hydraulic pressure control valve to the first engaging hydraulic pressure chamber and the first disengaging hydraulic pressure chamber through the first and second oil paths, respectively. The first and second surfaces have different pressure receiving areas. Therefore, even when the hydraulic pressure applied to the first surface from the first disengaging hydraulic pressure chamber is the same as the hydraulic pressure applied to the second surface from the first engaging hydraulic pressure chamber, the first piston is moved in the engaging direction by a pushing force caused by the pressure receiving area difference which corresponds to a section of the second surface larger than the first surface. In this manner, when changing from the disengaged state to the engaged state, since the first piston is moved by the pushing force corresponding to the pressure receiving area difference, the engaging shock is reduced while avoiding a complicated hydraulic pressure control which executes, for example, "the pre-charging."

In addition, since the first piston is moved by the pushing force corresponding to the pressure receiving area difference as described above, the movement of the first piston is achieved at a suitable speed without a complicated control for reducing a flow rate of hydraulic oil immediately before a completion of a stroke of the first piston in order to reduce the engaging shock. Thus, the engaging shock is reduced while avoiding the complicated control of the hydraulic oil.

Further in the control method, the controlling of the second friction plates to change from the disengaged state to the engaged state includes the pre-charging. Thus, the supply and discharge of hydraulic pressure to and from the second engaging hydraulic pressure chamber may selectively be performed by the second hydraulic pressure control valve, which results in reductions of manufacturing cost and size of the automatic transmission. In other words, for the second frictional engageable element, there is no need to provide the pressure receiving area difference between the third and fourth faces of the second piston. As a result, a degree of freedom in design is increased and the automatic transmission is reduced in size. Moreover, the moving speed of the second piston is set based on the hydraulic pressure supplied to the second engaging hydraulic pressure chamber by the second hydraulic pressure control valve. Thus, the hydraulic system is simplified, and as a result, the manufacturing cost is reduced.

As described above, according to the control method of the automatic transmission, the engaging shock is reduced, the engagement control time is shortened, the control is simplified, and the reductions of the manufacturing cost and size of the automatic transmission are achieved.

The hydraulic pressure (instruction pressure) in the first period may be kept at the given value. According to this configuration, since the instruction pressure in the first period is fixed to the certain value, the control is simplified compared to a case where the instruction pressure is changed in the first period.

The given value in the first period may be changed more gradually than the change of hydraulic pressure in the second period. According to this configuration, the engaging shock is reduced even without requiring to maintain the hydraulic pressure at the given value as described above. Thus, by the movement of the first piston due to the pressure receiving area difference in the first frictional engageable element, the control is simplified while reducing the engaging shock.

The second oil path may be provided with a pressure reducing valve for preventing the hydraulic pressure inside the first disengaging hydraulic pressure chamber from exceeding a preset value. In the adjusting the hydraulic pressure, the pressure reducing valve may reduce the given value to be lower than the preset value. According to this configuration, since the given value in the adjusting the hydraulic pressure is lower than the preset value of the pressure reducing valve, the pressures of the first engaging hydraulic pressure chamber and the first disengaging hydraulic pressure chamber are kept at the same pressure. Therefore, the first piston is moved only by the pushing force according to the pressure receiving area difference, which is advantageous in the reduction of the engaging shock when engaging the first frictional engageable element.

The first piston may be formed with a through-hole communicating the first engaging hydraulic pressure chamber with the first disengaging hydraulic pressure chamber. According to this configuration, since the through-hole is formed in the first piston, when the pressure of the first disengaging hydraulic pressure chamber increases due to the movement of the first piston, the hydraulic oil flows into the first engaging hydraulic pressure chamber through the through-hole. Therefore, when moving the first piston to the engaging position, the first engaging hydraulic pressure chamber receives the hydraulic oil also from the first disengaging hydraulic pressure chamber. Thus, only a small amount of hydraulic oil is required to be supplied to the first engaging hydraulic pressure chamber through the first oil path.

In this manner, responsiveness in engaging the first friction plates is improved. This improvement results in that even when a clearance between the friction plates is widened in order to reduce a so-called drag resistance of the friction plates, in other words, even when the required moving distance of the piston in engaging the first friction plates is increased, only a small amount of oil is required to flow into the first engaging hydraulic pressure chamber from the first oil path. Thus, both the reduction in the drag resistance and the improvement in the responsiveness of engaging the first frictional plates are achieved.

Further, a restricting mechanism for restricting an oil flow between the first engaging hydraulic pressure chamber and the first disengaging hydraulic pressure chamber may be disposed in the through-hole.

According to this configuration, the restricting mechanism blocks the flow of the hydraulic oil between the first engaging hydraulic pressure chamber and the first disengaging hydraulic pressure chamber through the through-hole. For example, when pressures of the first engaging hydraulic pressure chamber and the first disengaging hydraulic pressure chamber are uneven in the second period, the hydraulic oil flow through the through-hole is restricted. Thus, the pushing force for the first piston in the engaging direction is increased and the engagement control time is shortened more.

A volume of the second engaging hydraulic pressure chamber in the engaged state may be smaller than that of the first engaging hydraulic pressure chamber in the engaged state.

According to this configuration, the automatic transmission is reduced in size according to the smaller portion of the volume of the second engaging hydraulic pressure chamber.

According to another aspect of the present invention, a control device of an automatic transmission having the following structure is provided.

The automatic transmission which is the control target includes a first frictional engageable element, a second frictional engageable element, and a hydraulic mechanism.

The first frictional engageable element includes a first piston having a first surface and a second surface opposite from each other in axial directions of the first piston, and movable in the axial directions, a plurality of first friction plates disposed on the first surface side of the first piston, a first engaging hydraulic pressure chamber for applying hydraulic pressure to the second surface of the first piston and directing the first piston to an engaging position to push the first friction plates to be engaged with each other in an engaged state, and a first disengaging hydraulic pressure chamber for applying hydraulic pressure to the first surface of the first piston and directing the first piston to a disengaging position to cause the first friction plates to be in a disengaged state.

The second frictional engageable element includes a second piston having a third surface and a fourth surface opposite from each other in axial directions of the second piston, and movable in the axial directions, a plurality of second friction plates disposed on the third surface side of the second piston, and a second engaging hydraulic pressure chamber for applying hydraulic pressure to the fourth surface of the second piston and directing the second piston to an engaging position to push the second friction plates to be engaged with each other.

The hydraulic mechanism includes a first hydraulic pressure control valve having an output port of hydraulic pressure, and for supplying and discharging hydraulic pressure to and from the first engaging hydraulic pressure chamber and the first disengaging hydraulic pressure chamber, a first oil path communicating the output port of the first hydraulic pressure control valve with the first engaging hydraulic pressure chamber, a second oil path communicating the output port with the first disengaging hydraulic pressure chamber, a second hydraulic pressure control valve having an output port of hydraulic pressure, and for selectively supplying and discharging hydraulic pressure to and from the second engaging hydraulic pressure chamber, and a third oil path communicating the output port of the second hydraulic pressure control valve with the second engaging hydraulic pressure chamber.

In the first frictional engageable element of the automatic transmission, the second surface has a larger area for receiving hydraulic pressure than an area of the first surface for receiving hydraulic pressure.

The control device includes a processor configured to execute instructions to control the first friction plates to change from the disengaged state to the engaged state in response to a gear shift command, by controlling the first hydraulic pressure control valve to adjust the hydraulic pressure to a given value in a first period in response to the gear shift command, and increase the hydraulic pressure until the first friction plates reach the engaged state in a second period directly following the first period. The processor is configured to execute the instructions to control the second friction plates to change from the disengaged state to the engaged state in response to a gear shift command, by controlling the second hydraulic pressure control valve to pre-charge the second engaging hydraulic pressure chamber in response to the gear shift command by supplying hydraulic pressure at a highest target value, maintain the hydraulic pressure at a lower value than the highest target value immediately after the pre-charging the second engaging hydraulic pressure chamber, and increase the hydraulic pressure until the second friction plates reach the engaged state immediately after the maintaining the hydraulic pressures, a time length of the first period being shorter than a time length between a start of the pre-charging the second engaging hydraulic pressure chamber and a start of the increasing the hydraulic pressure.

According to the control device described above, similar to the above aspect, an engaging shock is reduced, an engagement control time is shortened, the control is simplified, and reductions in manufacturing cost and size of the automatic transmission are achieved.

BRIEF DESCRIPTION OF THE DRAWINGS

FIG. 2 is an engaging combination table of frictional engageable elements of the automatic transmission.

DETAILED DESCRIPTION OF EMBODIMENTS

Hereinafter, embodiments of the present invention are described with reference to the accompanying drawings. Note that the following embodiments are merely some modes of the present invention, and the present invention is not to be limited to any parts of the following modes except for their essential structures and configurations.

Embodiment

Overall Structure of Automatic Transmission 1

Figure 1:
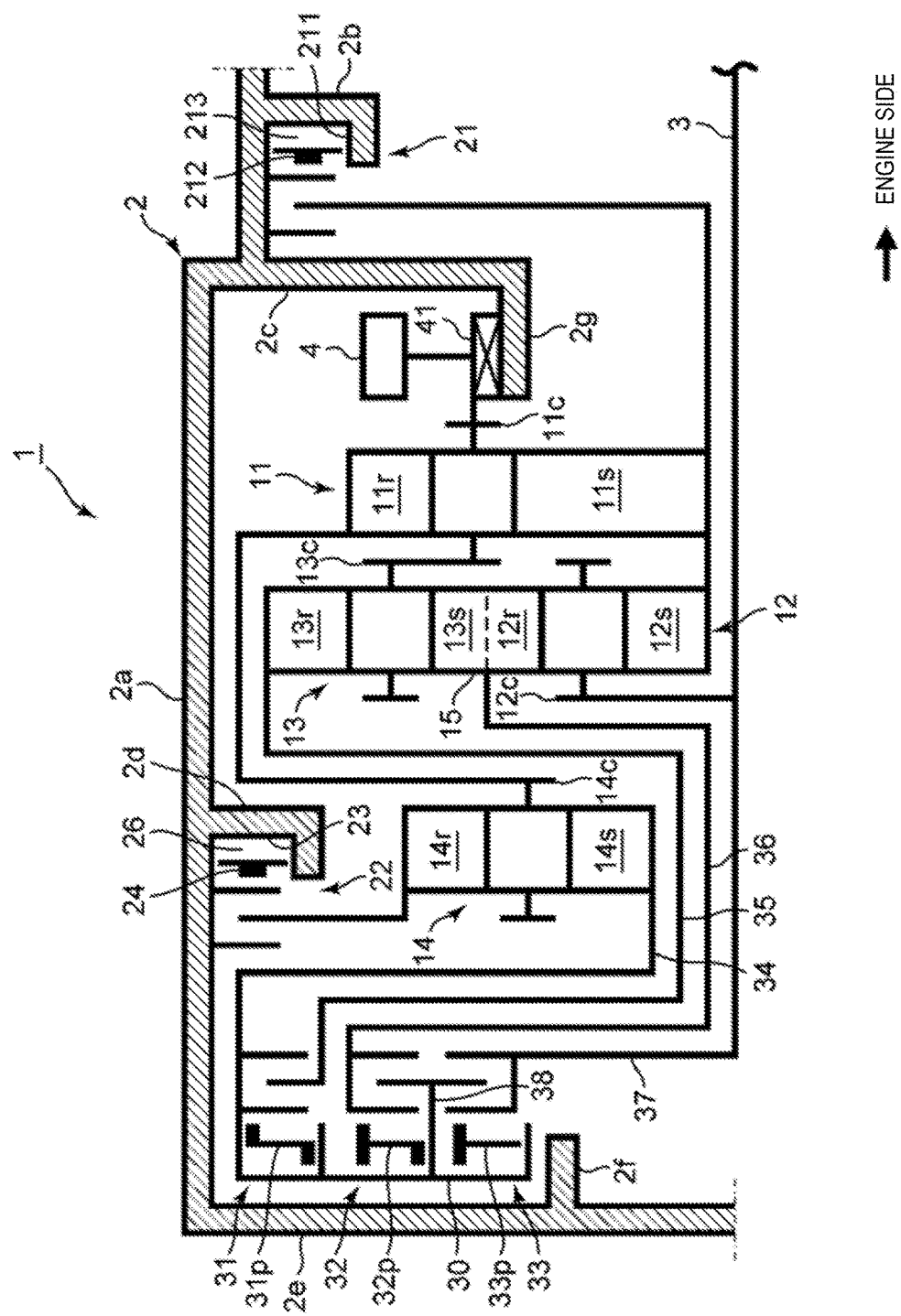
FIG. 1 is a substantial view of an automatic transmission according to one embodiment of the present invention.

FIG. 1 is a substantial view of an automatic transmission 1 for an automobile (vehicle) according to this embodiment. The automatic transmission 1 includes a transmission case 2. The automatic transmission 1 also includes an input shaft 3 extending from an engine side, an output gear 4, four planetary gear sets (first planetary gear set 11, second planetary gear set 12, third planetary gear set 13, and fourth planetary gear set 14), two brakes (first brake 21 and second brake 22), and three clutches (first clutch 31, second clutch 32, and third clutch 33), which are disposed in the transmission case 2. The four planetary gear sets, the two brakes, and the three clutches constitute a transmission mechanism.

The input shaft 3 receives drive force generated in the engine of the vehicle. The output gear 4 outputs a driving force at a given gear ratio controlled by the transmission mechanism. In this embodiment, an example in which the automatic transmission receives drive force of the engine without using a torque converter (fluid transmitter) is described.

The transmission case 2 has an outer circumferential wall 2a, a first intermediate wall 2b provided on an engine-side end part of the outer circumferential wall 2a, a second intermediate wall 2c provided on a side of the first intermediate wall 2b opposite from the engine (counter-engine side), a third intermediate wall 2d provided in an intermediate portion of the outer circumferential wall 2a in axial directions of the input shaft 3, a side wall 2e provided on a counter-engine-side end part of the outer circumferential wall 2a, a boss part 2f extending from a center part of the side wall 2e to the engine side, and a cylindrical part 2g extending from an inner circumferential end of the second intermediate wall 2c to the counter-engine side.

The four planetary gear sets 11 to 14 are disposed from the engine side in the order of the first planetary gear set 11, the second (inner circumferential) and third (outer circumferential) planetary gear sets 12 and 13 disposed overlapping with each other in radial directions of the transmission case 2, and the fourth planetary gear set 14. The first planetary gear set 11 includes a carrier 11c, a pinion (not illustrated) supported by the carrier 11c, a sun gear 11s, and a ring gear 11r. The first planetary gear set 11 is a single pinion type in which the pinion is directly meshed with the sun gear 11s and the ring gear 11r. The second to fourth planetary gear sets 12 to 14 are also a single pinion type and include carrier 12c, 13c and 14c, pinions (not illustrated), sun gears 12s, 13s and 14s, and ring gears 12r, 13r and 14r, respectively.

The ring gear 12r of the second planetary gear set 12 and the sun gear 13s of the third planetary gear set 13 which are overlapped in the radial directions are integrally formed by, for example, welding or shrink-fitting. Thus, the ring gear 12r and the sun gear 13s are normally coupled to each other and form an integrated rotational element 15. The sun gear 11s of the first planetary gear set 11 is normally coupled to the sun gear 12s of the second planetary gear set 12, the ring gear 11r of the first planetary gear set 11 is normally coupled to the carrier 14c of the fourth planetary gear set 14, and the carrier 11c of the first planetary gear set 11 is normally coupled to the carrier 13c of the third planetary gear set 13. The input shaft 3 is normally coupled to the carrier 12c of the second planetary gear set 12. The output gear 4 is normally coupled to the carrier 11c of the first planetary gear set 11 and the carrier 13c of the third planetary gear set 13. The output gear 4 is rotatably supported to the cylindrical part 2g of the transmission case 2 via a bearing 41.

The sun gear 14s of the fourth planetary gear set 14 is coupled to a first rotational member 34 extending to the counter-engine side. Similarly, the ring gear 13r of the third planetary gear set 13 is coupled to a second rotational member 35 and the integrated rotational element 15 is coupled to a third rotational member 36. These rotational members 35 and 36 also extend to the counter-engine side. The carrier 12c of the second planetary gear set 12 is coupled to a fourth rotational member 37 via the input shaft 3.

The first brake 21 is disposed on the first intermediate wall 2b of the transmission case 2. The first brake 21 includes a cylinder 211, a piston 212 fitted into the cylinder 211, and a hydraulic oil pressure chamber (hereinafter, may be referred to as "the engaging hydraulic pressure chamber") 213 defined by the cylinder 211 and the piston 212. When a given engaging hydraulic pressure is supplied to the hydraulic oil pressure chamber 213, a friction plate of the first brake 21 is engaged and the first brake 21 fixes the sun gear 11s of the first planetary gear set 11 and the sun gear 12s of the second planetary gear set 12 to the transmission case 2.

The second brake 22 is disposed on the third intermediate wall 2d. The second brake 22 includes a cylinder 23, a piston 24 fitted into the cylinder 23, and an engaging hydraulic pressure chamber 26 defined by the cylinder 23 and the piston 24. When a given engaging hydraulic pressure is supplied to the engaging hydraulic pressure chamber 26, a friction plate of the second brake 22 is engaged and the second brake 22 fixes the ring gear 14r of the fourth planetary gear set 14 to the transmission case 2. In this embodiment, an example of applying the frictional engageable element provided with features of the present invention to the second brake 22 is described. This second brake 22 is described later in detail with reference to FIGS. 3 to 11.

The first to third clutches 31 to 33 are disposed in a counter-engine side end section inside the transmission case 2. The first to third clutches 31 to 33 are overlapped with each other in the radial directions so that the second clutch 32 is located on the inner circumferential side of the first clutch 31 and the third clutch 33 is located on the inner circumferential side of the second clutch 32 at the same position in the axial directions.

The first clutch 31 disconnects the sun gear 14s of the fourth planetary gear set 14 from the ring gear 13r of the third planetary gear set 13. In other words, the first clutch 31 switches the connection state between the first rotational member 34 coupled to the sun gear 14s and the second rotational member 35 coupled to the ring gear 13r.

The second clutch 32 disconnects the sun gear 14s of the fourth planetary gear set 14 from the integrated rotational element 15 (i.e., the ring gear 12r of the second planetary gear set 12 and the sun gear 13s of the third planetary gear set 13). In other words, the second clutch 32 switches the connection state between the first rotational member 34 coupled to the sun gear 14s and the third rotational member 36 coupled to the integrated rotational element 15.

The third clutch 33 disconnects the sun gear 14s of the fourth planetary gear set 14 from the input shaft 3 and the carrier 12c of the second planetary gear set 12. In other words, the third clutch 33 switches the connection state between the first rotational member 34 coupled to the sun gear 14s and the fourth rotational member 37 coupled to the carrier 12c via the input shaft 3.

The first rotational member 34 is switched in the connection state with the second rotational member 35 by the first clutch 31, switched in the connection state with the third rotational member 36 by the second clutch 32, and switched in the connection state with the fourth rotational member 37 by the third clutch 33. Thus, the first rotational member 34 is commonly used as one of each pair of rotational members of which the connection state is switched by one of the first to third clutches 31 to 33. Therefore, a common rotational member 30 having a wall perpendicular to the axis of the input shaft 3 is disposed near the side wall 2e of the transmission case 2, on the counter-engine side of the first to third clutches 31 to 33. Further, the first rotational member 34 is coupled to the common rotational member 30.

The common rotational member 30 is commonly used by the first to third clutches 31 to 33 and supports cylinders, pistons, hydraulic oil pressure chambers, hydraulic oil paths, centrifugal balance hydraulic pressure chambers, centrifugal balance chamber components, etc. of the first to third clutches 31 to 33. FIG. 1 illustrates pistons 31p, 32p and 33p of the first to third clutches 31 to 33 in a simplified manner. Note that a common member 38 is attached to the second and third clutches 32 and 33 to hold friction plates thereof.

As described above, the automatic transmission 1 of this embodiment includes the transmission mechanism having the first to fourth planetary gear sets 11 to 14, and the first and second brakes 21 and 22 and the first to third clutches 31 to 33 (five frictional engageable elements), and for changing the gear ratio between the input shaft 3 and the output gear 4. FIG. 2 is an engaging combination table of the five frictional engageable elements of the automatic transmission 1. As indicated in the engaging combination table of FIG. 2, three of the five frictional engageable elements are selectively engaged (o marks) to realize first to eighth forward gear ranges and a reverse gear range. In FIG. 2, "CL1," "CL2," and "CL3" indicate the first to third clutches 31 to 33, respectively, and "BR1" and "BR2" indicate the first and second brakes 21 and 22, respectively.

Details of Frictional Engageable Element

1. Second Brake 22

Figure 3:
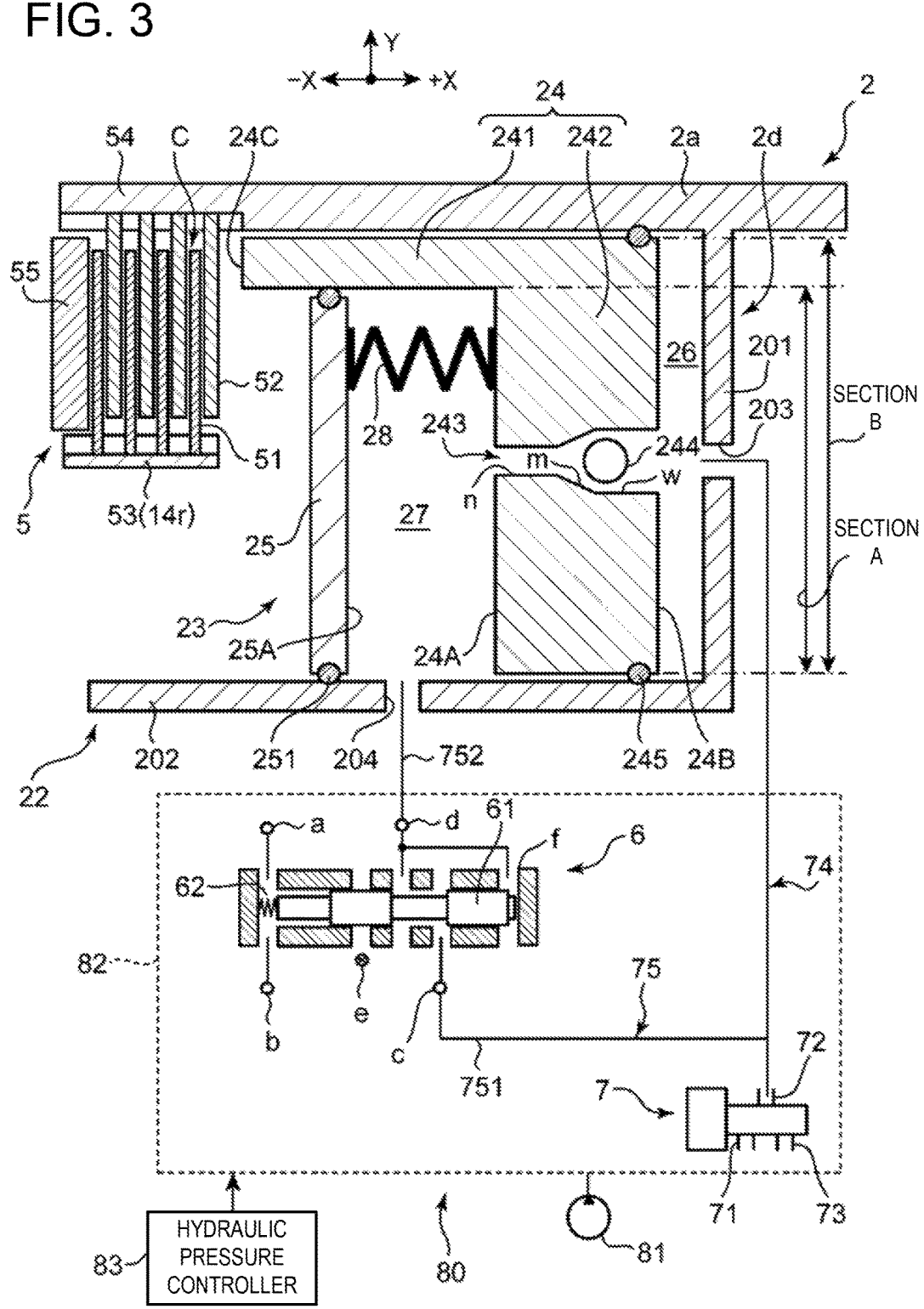
FIG. 3 is a view illustrating a schematic cross section of a structure of a second brake which is one of the frictional engageable elements of the automatic transmission, and illustrating a configuration of a hydraulic mechanism of the second brake.

FIG. 3 is a view illustrating a schematic cross section of a structure of one of the frictional engageable elements of the automatic transmission 1 and illustrating a configuration of a hydraulic mechanism 80 of the frictional engageable element. Here, the second brake 22 is illustrated in FIG. 3. In FIGS. 3 and 8 to 11, the axial directions of the input shaft 3 are indicated as X directions and the radial directions of the automatic transmission 1 are indicated as Y directions. Further, for the sake of convenience, the left side of the drawings in the X directions is indicated as the −X direction and the right side of the drawings in the X directions is indicated as the +X direction.

The second brake 22 is disposed in the cylinder 23 formed by the third intermediate wall 2d as described above, and includes the piston 24, a sealing ring 25, the engaging hydraulic pressure chamber 26, a disengaging hydraulic pressure chamber 27, a return spring 28, and a friction plate unit 5 (a plurality of friction plates). The hydraulic mechanism 80 is attached to the second brake 22. The hydraulic mechanism 80 includes an oil pump 81, a hydraulic circuit 82, and a hydraulic pressure controller 83 for controlling the oil pump 81 and the hydraulic circuit 82. The hydraulic circuit 82 includes a pressure reducing valve 6 and a linear solenoid valve 7 (hydraulic pressure control valve).

The third intermediate wall 2d is formed by a first wall portion 201 extending radially inwardly from the outer circumferential wall 2a of the transmission case 2, and a second wall portion 202 extending axially (in the −X direction) from a radially inner edge of the first wall portion 201. The outer circumferential wall 2a and the second wall portion 202 oppose to each other in the radial directions with a given gap therebetween. A space formed by the outer circumferential wall 2a and the first and second wall portions 201 and 202 is the space of the cylinder 23 for the second brake 22. The first wall portion 201 is formed with a first supply port 203 for supplying hydraulic pressure to the engaging hydraulic pressure chamber 26. The second wall portion 202 is formed with a second supply port 204 for supplying hydraulic pressure to the disengaging hydraulic pressure chamber 27.

The piston 24 has a first surface 24A and a second surface 24B axially opposite from each other, and is axially movable in the space between the outer circumferential wall 2a and the second wall portion 202 (inside the cylinder 23). The first surface 24A faces the disengaging hydraulic pressure chamber 27 and the second surface 24B faces the engaging hydraulic pressure chamber 26. The piston 24 moves between a disengaging position at which the friction plate unit 5 is in a disengaged state (e.g., the position illustrated in FIG. 8) and an engaging position at which the piston 24 pushes the friction plate unit 5 to be in an engaged state (the position illustrated in FIG. 11).

The piston 24 includes a pushing piece 241 disposed adjacently to the outer circumferential wall 2a, and a pressure receiving piece 242 for sliding on an inner circumferential surface of the outer circumferential wall 2a and an outer circumferential surface of the second wall portion 202. The pressure receiving piece 242 is bored a through-hole 243 axially penetrating the pressure receiving piece 242. Further, sealing members 245 are fitted into inner and outer circumferential surfaces of the pressure receiving piece 242.

The pushing piece 241 projects in the −X direction from the pressure receiving piece 242, and includes, at a tip end in a pushing direction (in the −X direction), a tip end surface 24C for applying a pushing force to the friction plate unit 5. The pressure receiving piece 242 is a separator between the engaging hydraulic pressure chamber 26 and the disengaging hydraulic pressure chamber 27. Note that in this embodiment, the engaging hydraulic pressure chamber 26 may be communicated with the disengaging hydraulic pressure chamber 27 by the through-hole 243. The sealing members 245 are for sealing between the inner circumferential surface of the pressure receiving piece 242 and the outer circumferential surface of the second wall portion 202 and sealing between the outer circumferential surface of the pressure receiving piece 242 and the inner circumferential surface of the outer circumferential wall 2a, while allowing the axial movement of the piston 24.

The through-hole 243 is a cylindrical hole having different diameters in the axial directions, and has a larger diameter section w, a smaller diameter section n, and an intermediate section m therebetween. The larger diameter section w is formed on the second surface 24B side, i.e., the engaging hydraulic pressure chamber 26 side. The smaller diameter section n is formed on the first surface 24A side, i.e., the disengaging hydraulic pressure chamber 27 side. The intermediate section m is gradually tapered from the larger diameter section w to the smaller diameter section n.

A pressure ball 244 (restricting mechanism) for restricting a flow of hydraulic oil from the engaging hydraulic pressure chamber 26 to the disengaging hydraulic pressure chamber 27 is disposed inside the through-hole 243. A diameter of the pressure ball 244 is smaller than a diameter of the larger diameter section w and larger than a diameter of the smaller diameter section n. When the hydraulic pressure of the disengaging hydraulic pressure chamber 27 is the same as or higher than that of the engaging hydraulic pressure chamber 26, the pressure ball 244 floats within the larger diameter section w and does not restrict the flow of the hydraulic oil from the engaging hydraulic pressure chamber 26 to the disengaging hydraulic pressure chamber 27.

On the other hand, when the hydraulic pressure inside the engaging hydraulic pressure chamber 26 is higher than that of the disengaging hydraulic pressure chamber 27, the pressure ball 244 is stopped at the intermediate section m to block the through-hole 243, and restricts the flow of the hydraulic oil between the engaging hydraulic pressure chamber 26 and the disengaging hydraulic pressure chamber 27.

The sealing ring 25 is a flat plate member having an annular shape and disposed on the first surface 24A side of the piston 24 to oppose to the pressure receiving piece 242. The sealing ring 25 is disposed between the pushing piece 241 of the piston 24 and the second wall portion 202, and forms the disengaging hydraulic pressure chamber 27 together with the pushing piece 241 of the piston 24 and the second wall portion 202. Sealing members 251 are attached to inner and outer circumferential surfaces of the sealing ring 25. The sealing members 251 are for sealing between an outer circumferential edge of the sealing ring 25 and an inner circumferential surface of the pushing piece 241 and sealing between an inner circumferential edge of the sealing ring 25 and the outer circumferential surface of the second wall portion 202.

The engaging hydraulic pressure chamber 26 is space where hydraulic pressure for moving the piston 24 to the engaging position (in the −X direction) is supplied. The engaging hydraulic pressure chamber 26 is defined by the first and second wall portions 201 and 202, the outer circumferential wall 2a, and the second surface 24B of the piston 24. In other words, the engaging hydraulic pressure chamber 26 hydraulically applies the second surface 24B a pushing force to move the piston 24 to the engaging position at which the friction plate unit 5 is pushed to reach the engaged state (friction plates are engaged with each other).

The disengaging hydraulic pressure chamber 27 is space where hydraulic pressure for moving the piston 24 to the disengaging position (in the +X direction) is supplied. The disengaging hydraulic pressure chamber 27 is defined by the second wall portion 202, the pushing piece 241 of the piston 24, a +X-side surface 25A of the sealing ring 25, and the first surface 24A of the piston 24. In other words, the disengaging hydraulic pressure chamber 27 hydraulically applies the first surface 24A the pushing force to move the piston 24 to the disengaging position at which the friction plate unit 5 is pushed to reach the disengaged state. The return spring 28 for elastically biasing the piston in the +X direction is disposed inside this disengaging hydraulic pressure chamber 27. When hydraulic pressure is not supplied to the engaging hydraulic pressure chamber 26, the return spring 28 moves (returns) the piston 24 in the +X direction.

Here, a pressure receiving area of the second surface 24B is set larger than that of the first surface 24A. Hereinafter, a section of the first surface 24A to which hydraulic pressure is applied from the disengaging hydraulic pressure chamber 27, i.e., the pressure receiving area of the first surface 24A, is referred to as the section A (schematically indicated as "SECTION A" in FIG. 3). Further, a section of the second surface 24B to which hydraulic pressure is applied from the engaging hydraulic pressure chamber 26, i.e., the pressure receiving area of the second surface 24B, is referred to as the section B (schematically indicated as "SECTION B" in FIG. 3). In this embodiment, the relationship between these pressure receiving areas is SECTION B>SECTION A.

Such a difference in pressure receiving area between the sections A and B allows the piston 24 to move based on the difference. For example, if the engaging hydraulic pressure chamber 26 and the disengaging hydraulic pressure chamber 27 are supplied the same level of hydraulic pressure, the hydraulic pressure is received at the first and second surfaces 24A and 24B. In this case, since the pressure receiving area of the second surface 24B is larger than the pressure receiving area of the first surface 24A, a pushing force in the −X direction, corresponding to the pressure receiving area difference, acts on the piston 24. Since the piston 24 is bored the through-hole 243, upon the action of the pushing force in the −X direction, the oil inside the disengaging hydraulic pressure chamber 27 flows into the engaging hydraulic pressure chamber 26 through the through-hole 243 as the piston 24 moves. Thus, the piston 24 moves further in the −X direction. In other words, the hydraulic pressures in the engaging hydraulic pressure chamber 26 and the disengaging hydraulic pressure chamber 27 become even, and then the piston 24 is moved in the −X direction by the pushing force corresponding to the pressure receiving area difference.

The friction plate unit 5 includes a plurality of friction plates disposed by leaving clearances therebetween and is disposed on the first surface 24A side of the piston 24. For example, the friction plate unit 5 is comprised of a plurality of drive plates 51 and a plurality of driven plates 52 which are alternately arranged by leaving a given clearance C. Facings are adhered to both surfaces of each drive plate 51. The drive plates 51 are spline coupled to a first spline part 53, and the driven plates 52 are spline coupled to a second spline part 54. The first spline part 53 corresponds to an outer circumferential part of the ring gear 14r of the fourth planetary gear set 14 illustrated in FIG. 1. The second spline part 54 is provided to a part of the outer circumferential wall 2a of the transmission case 2.

The tip end surface 24C of the piston 24 contacts with one of the driven plates 52 which is located on the most +X side and applies the pushing force to the friction plate unit 5. A retaining plate 55 is disposed adjacently to one of the drive plates 51 which is located on the most −X side. The retaining plate 55 restricts movements of the drive plates 51 and the driven plates 52 in the −X direction.

The hydraulic mechanism 80 supplies and discharges a given level of hydraulic pressure to and from the frictional engageable element (the second brake 22 in FIG. 3) of the automatic transmission 1. The oil pump 81 of the hydraulic mechanism 80 is driven by the engine to flow hydraulic oil to a required part(s) and generates a given hydraulic pressure. The hydraulic circuit 82 is provided to each of the first and second brakes 21 and 22 and the first to third clutches 31 to 33 (frictional engageable elements), and selectively supplies hydraulic pressure to the frictional engageable elements to realize the respective gear ranges illustrated in FIG. 2. Regarding the hydraulic circuit 82, FIG. 3 only illustrates the pressure reducing valve 6 and the linear solenoid valve 7 that performs the supply and discharge of the hydraulic pressure to and from the second brake 22.

The linear solenoid valve 7 is a hydraulic pressure control valve for supplying and discharging hydraulic pressure to and from each of the engaging hydraulic pressure chamber 26 and the disengaging hydraulic pressure chamber 27. The linear solenoid valve 7 includes an input port 71 for receiving hydraulic oil from the oil pump 81, an output port 72 for outputting the hydraulic oil (hydraulic pressure), a drain port 73 for discharging the hydraulic oil, and a spool (not illustrated) which operates in response to a power distribution to a coil thereof. The operation of the spool causes the input and output ports 71 and 72 to communicate with each other when supplying the hydraulic pressure to the engaging hydraulic pressure chamber 26 and the disengaging hydraulic pressure chamber 27, and causes the output port 72 and the drain port 73 to communicate with each other when discharging the hydraulic pressure. The linear solenoid valve 7 adjusts an amount of oil discharged from the output port 72 based on a control of the power distribution amount to the coil.

The hydraulic circuit 82 includes a first oil path 74 for communicating the linear solenoid valve 7 with the engaging hydraulic pressure chamber 26, and a second oil path 75 for communicating the linear solenoid valve 7 with the disengaging hydraulic pressure chamber 27. For example, an upstream end of the first oil path 74 is connected to the output port 72 and a downstream end of the first oil path 74 is connected to the first supply port 203 communicating with the engaging hydraulic pressure chamber 26. An upstream end of the second oil path 75 is connected to the output port 72 and a downstream end of the second oil path 75 is connected to the second supply port 204 communicating with the disengaging hydraulic pressure chamber 27. Thus, both of the first and second oil paths 74 and 75 receive the hydraulic oil from the same output port 72 of the linear solenoid valve 7 instead of receiving it through different hydraulic supply paths.

The second oil path 75 is divided into an upstream oil path 751 and a downstream oil path 752 by the pressure reducing valve 6. When causing the friction plate unit 5 to change from the disengaged state to the engaged state, hydraulic pressure is supplied to the engaging hydraulic pressure chamber 26 and the disengaging hydraulic pressure chamber 27 simultaneously from the output port 72 of the linear solenoid valve 7 through the first and second oil paths 74 and 75.

The pressure reducing valve 6 is built in the second oil path 75 and maintains the hydraulic pressure of the disengaging hydraulic pressure chamber 27 at or below a given value (a set pressure of the pressure reducing valve 6). The pressure reducing valve 6 includes a plurality of ports a, b, c, d, e and f, and a spool 61 for switching ports among the plurality of ports. The ports "a" and "b" communicate with a spring chamber accommodating a return spring 62 for elastically biasing the spool 61 in the +X direction. The port "c" is an input port and the port "d" is an output port. The input port c is connected to a downstream end of the upstream oil path 751 of the second oil path 75. The output port d is connected to an upstream end of the downstream oil path 752, and thus the output port d is connected with the second supply port 204.

The port "e" is a drain port and the port "f" is a feedback port. When the biasing force of the return spring 62 is superior to (higher than) hydraulic pressure supplied to the feedback port f, the input and output ports c and d communicate with each other. Thus, the upstream and downstream oil paths 751 and 752 communicate with each other, which allows the hydraulic pressure to be supplied to the disengaging hydraulic pressure chamber 27. On the other hand, when hydraulic pressure which overtakes the biasing force of the return spring 62 is supplied to the feedback port f, the hydraulic pressure moves the spool 61 in the −X direction and the output port d and the drain port e communicate with each other, which allows the hydraulic pressure to be discharged from the disengaging hydraulic pressure chamber 27. In other words, when the hydraulic pressure of the disengaging hydraulic pressure chamber 27 becomes high, the hydraulic pressure supplied to the pressure reducing valve 6 from the feedback port f also becomes high, the spool 61 is operated to communicate the output port d with the drain port e, and the disengaging hydraulic pressure chamber 27 is depressurized. When the biasing force of the return spring 62 becomes superior accordingly, the spool 61 resumes to communicate the input port c with the output port d, which allows the hydraulic pressure to be supplied to the disengaging hydraulic pressure chamber 27.

The hydraulic pressure controller 83 controls the hydraulic pressures supplied to the engaging hydraulic pressure chamber 26 and the disengaging hydraulic pressure chamber 27 by controlling the operation of the solenoid of the linear solenoid valve 7. The hydraulic pressure controller 83 also controls the linear solenoid valves connected to the other frictional engageable elements, and thus controls hydraulic pressures supplied to the first brake 21 and the first to third clutches 31 to 33.

2. First Brake 21

Figure 4:
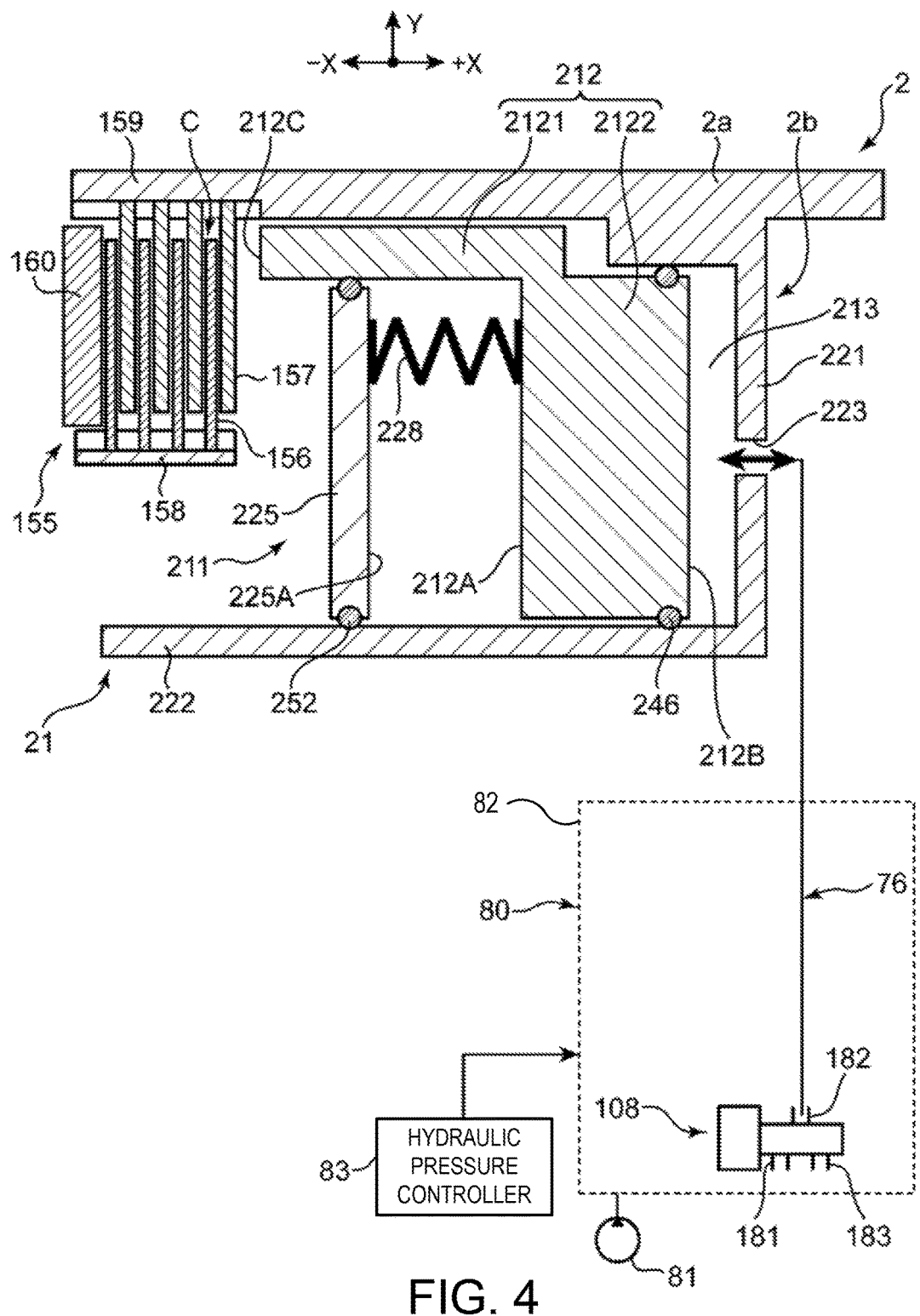
FIG. 4 is a view illustrating a schematic cross section of a structure of a first brake which is one of the frictional engageable elements of the automatic transmission, and illustrating a configuration of a hydraulic mechanism of the first brake.

FIG. 4 is a view illustrating a schematic cross section of a structure of the first brake 21 which is one of the frictional engageable elements of the automatic transmission 1, and illustrating a configuration of a hydraulic mechanism 80 of the first brake 21. Also in FIG. 4, similar to FIG. 3, the axial directions of the input shaft 3 are indicated as X directions and the radial directions of the automatic transmission 1 are indicated as Y directions. Further, for the sake of convenience, the left side of the drawing in the X directions is indicated as the −X direction and the right side of the drawing in the X directions is indicated as the +X direction.

The first brake 21 is a frictional engageable element disposed on the first intermediate wall 2b of the transmission case 2 as described above, and includes the piston 212, a sealing ring 225, and the engaging hydraulic pressure chamber 213, a return spring 228, and a friction plate unit 155 (a plurality of friction plates). The first brake 21 is also provided with the hydraulic mechanism 80. The hydraulic mechanism 80 includes an oil pump 81, a hydraulic circuit 82, and a hydraulic pressure controller 83 for controlling the oil pump 81 and the hydraulic circuit 82. The hydraulic circuit 82 includes a linear solenoid valve 108 (hydraulic pressure control valve).

The first intermediate wall 2b is formed by a first wall portion 221 extending radially inwardly from the outer circumferential wall 2a of the transmission case 2, and a second wall portion 222 extending axially (in the −X direction) from a radially inner edge of the first wall portion 221. The outer circumferential wall 2a and the second wall portion 222 oppose to each other in the radial directions by providing a given gap therebetween. A space formed by the outer circumferential wall 2a and the first and second wall portions 221 and 222 forms the space of the cylinder 211 for the first brake 21. The first wall portion 221 is formed with a supply port 223 for supplying hydraulic pressure to the engaging hydraulic pressure chamber 213.

The piston 212 has a third surface 212A and a fourth surface 212B axially opposite from each other and is axially movable in the space between the outer circumferential wall 2a and the second wall portion 222 (inside the cylinder 211). The third surface 212A faces the sealing ring 225 side (described later) and the fourth surface 212B faces the engaging hydraulic pressure chamber 213. The piston 212 moves between a disengaging position at which the friction plate unit 155 is in a disengaged state and an engaging position at which the piston 212 pushes the friction plate unit 155 to be in an engaged state.

The piston 212 includes a pushing piece 2121 disposed adjacently to the outer circumferential wall 2a, and a pressure receiving piece 2122 for sliding on an inner circumferential surface of the outer circumferential wall 2a and an outer circumferential surface of the second wall portion 222. Sealing members 246 are fitted into inner and outer circumferential surfaces of the pressure receiving piece 2122.

The pushing piece 2121 projects in the −X direction from the pressure receiving piece 2122, and includes at a tip end in a pushing direction (in the −X direction), a tip end surface 212C for applying a pushing force to the friction plate unit 155. The pressure receiving piece 2122 is a separator which receives hydraulic pressure from the engaging hydraulic pressure chamber 213. The sealing members 246 are for sealing between the inner circumferential surface of the pressure receiving piece 2122 and the outer circumferential surface of the second wall portion 222, and sealing between the outer circumferential surface of the pressure receiving piece 2122 and the inner circumferential surface of the outer circumferential wall 2a, while allowing the axial movement of the piston 212.

The sealing ring 225 is a flat plate member having an annular shape and disposed on the third surface 212A side of the piston 212 to oppose to the pressure receiving piece 2122. The sealing ring 225 is disposed between the pushing piece 2121 of the piston 212 and the second wall portion 222. Sealing members 252 are attached to inner and outer circumferential surfaces of the sealing ring 225. The sealing members 252 are for sealing between an outer circumferential edge of the sealing ring 225 and an inner circumferential surface of the pushing piece 2121 and sealing between an inner circumferential edge of the sealing ring 225 and the outer circumferential surface of the second wall portion 222.

The engaging hydraulic pressure chamber 213 is defined by the first and second wall portions 221 and 222, the outer circumferential wall 2a, and the fourth surface 212B of the piston 212. In other words, the engaging hydraulic pressure chamber 213 hydraulically applies to the fourth surface 212B a pushing force to move the piston 212 to the engaging position at which the friction plate unit 155 is pushed to reach the engaged state (friction plates are engaged with each other).

The return spring 228 for elastically biasing the piston 212 in the +X direction is disposed inside the space between the pressure receiving piece 2122 of the piston 212 and a +X-side surface 225A of the sealing ring 225. When hydraulic pressure is not supplied to the engaging hydraulic pressure chamber 213, the return spring 228 moves (returns) the piston 212 in the +X direction.

The friction plate unit 155 includes a plurality of friction plates disposed by leaving clearances therebetween and is disposed on the third surface 212A side of the piston 212. For example, the friction plate unit 155 is comprised of a plurality of drive plates 156 and a plurality of driven plates 157 which are alternately arranged by leaving a given clearance C. Facings are adhered to both surfaces of each drive plate 156. The drive plates 156 are spline coupled to a first spline part 158, and the driven plates 157 are spline coupled to a second spline part 159. The first spline part 158 corresponds to a shaft part of the sun gear 11s of the first planetary gear set 11 and the sun gear 12s of the second planetary gear set 12 illustrated in FIG. 1. The second spline part 159 is provided to a part of the outer circumferential wall 2a of the transmission case 2.

The tip end surface 212C of the piston 212 contacts with one of the driven plates 157 which is located on the most +X side and applies the pushing force to the friction plate unit 155. A retaining plate 160 is disposed adjacently to one of the drive plates 156 which is located on the most −X side. The retaining plate 160 restricts movements of the drive plates 156 and the driven plates 157 in the −X direction.

The hydraulic mechanism 80 supplies and discharges a given level of hydraulic pressure to and from the frictional engageable element (the first brake 21) of the automatic transmission 1. Similar to FIG. 3, FIG. 4 only illustrates the linear solenoid valve 108 which performs the supply and discharge of hydraulic pressure to and from the first brake 21 in the configuration of the hydraulic circuit 82.

The linear solenoid valve 108 is a hydraulic pressure control valve for selectively supplying and discharging hydraulic pressure to and from the engaging hydraulic pressure chamber 213. The linear solenoid valve 108 includes an input port 181 for receiving hydraulic oil from the oil pump 81, an output port 182 for outputting the hydraulic oil (hydraulic pressure), a drain port 183 for discharging the hydraulic oil, and a spool (not illustrated) which operates in response to a power distribution to a coil thereof. The operation of the spool causes the input and output ports 181 and 182 to communicate with each other when supplying the hydraulic pressure to the engaging hydraulic pressure chamber 213, and causes the output port 182 and the drain port 183 to communicate with each other when discharging the hydraulic pressure. The linear solenoid valve 108 also, similar to the linear solenoid valve 7, adjusts an amount of oil discharged from the output port 182 based on a control of the power distribution amount to the coil.

The hydraulic circuit 82 includes a third oil path 76 for communicating the linear solenoid valve 108 with the engaging hydraulic pressure chamber 213. For example, an upstream end of the third oil path 76 is connected to the output port 182 and a downstream end of the third oil path 76 is connected to the supply port 223 communicating with the engaging hydraulic pressure chamber 213. For the first brake 21, the supply and discharge of hydraulic oil are selectively performed (one of the supply and discharge of hydraulic oil is performed at a time) to the engaging hydraulic pressure chamber 213 by the linear solenoid valve 108.

The hydraulic pressure controller 83 adjusts hydraulic pressure supplied to the engaging hydraulic pressure chamber 213 by controlling the operation of the solenoid of the linear solenoid valve 108.

Control System Configuration of Automatic Transmission 1

Figure 5:
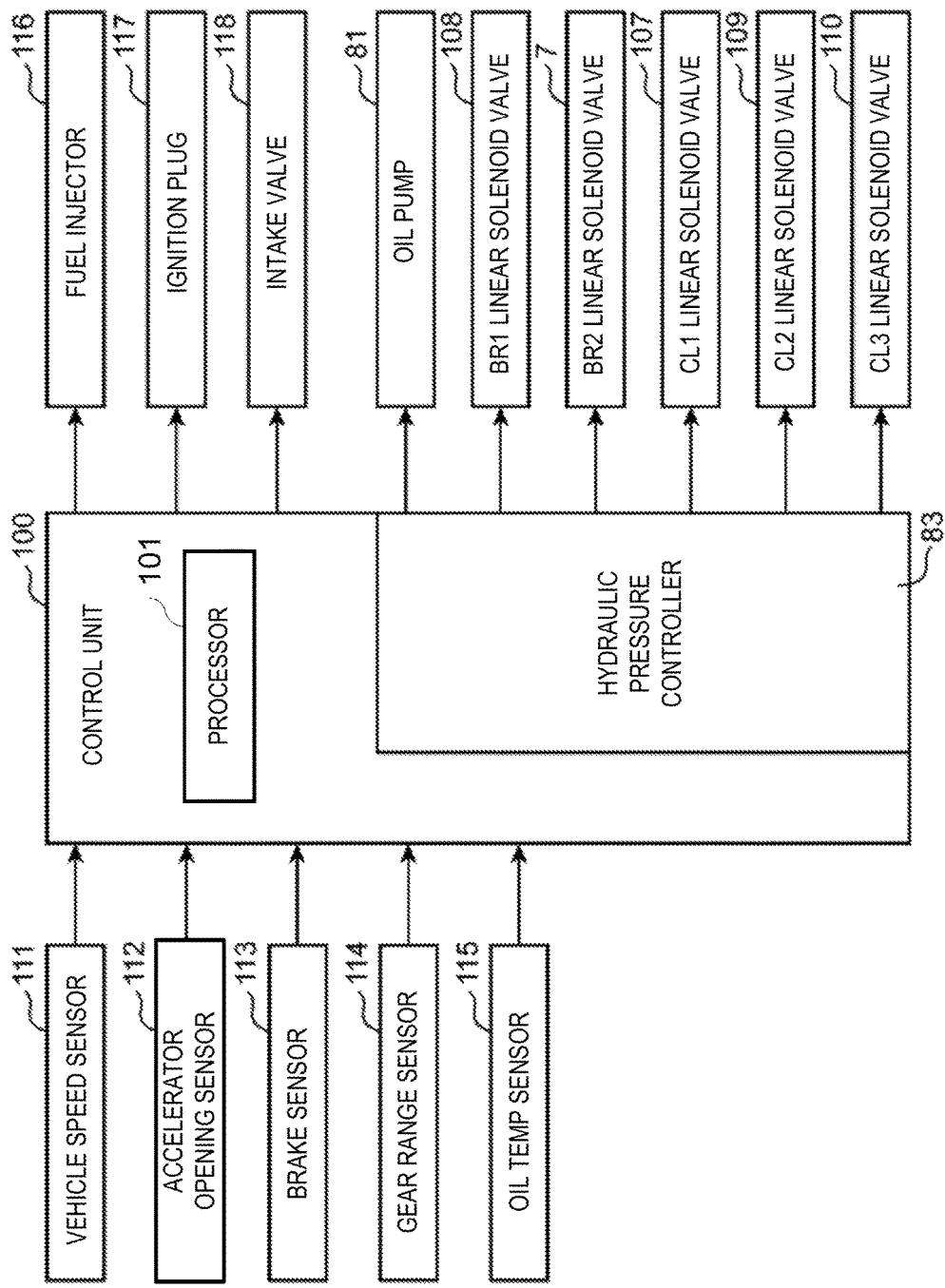
FIG. 5 is a block diagram schematically illustrating a control system configuration of the automatic transmission of the embodiment.

A control system configuration of the automatic transmission 1 of this embodiment is described with reference to FIG. 5 which is a block diagram schematically illustrating the control system configuration. In FIG. 5, the linear solenoid valve connected to the first brake 21 is indicated as "BR1 LINEAR SOLENOID VALVE 108." Similarly, the linear solenoid valve connected to the second brake 22 is indicated as "BR2 LINEAR SOLENOID VALVE 7," the linear solenoid valve connected to the first clutch 31 is indicated as "CL1 LINEAR SOLENOID VALVE 107," the linear solenoid valve connected to the second clutch 32 is indicated as "CL2 LINEAR SOLENOID VALVE 109," and the linear solenoid valve connected to the third clutch 33 is indicated as "CL3 LINEAR SOLENOID VALVE 110."

As illustrated in FIG. 5, a control unit 100 that is the control device of the vehicle in this embodiment receives various information from the vehicle, such as vehicle speed information detected by a vehicle speed sensor 111, accelerator opening information detected by an accelerator opening sensor 112, brake information detected by a brake sensor 113, gear range (gear shift) information detected by a gear range sensor 114, and oil temperature information detected by an oil temperature sensor 115.

The control unit 100 performs calculations based on the received various information and transmits control signals to a fuel injector 116, an ignition plug 117, and an intake valve 118. The control unit 100 includes the hydraulic pressure controller 83 and a processor 101 configured to execute instructions to send and receive signals, and the hydraulic pressure controller 83 transmits control signals to the oil pump 81, the BR1 linear solenoid valve 108, the BR2 linear solenoid valve 7, the CL1 linear solenoid valve 107, the CL2 linear solenoid valve 109, and the CL3 linear solenoid valve 110. The hydraulic pressure controller 83 may have a separate processor or may utilize the processor 101 as an integrated part of the control unit 100.

Note that the control unit 100 stores a given gear shift map (not illustrated). The gear shift map has the vehicle speed and the accelerator opening as parameters and is designed to have a plurality of ranges for obtaining a suitable gear range according to these vehicle speed and accelerator opening.

Hydraulic Pressure Control Executed by Control Unit 100

A hydraulic pressure control executed by the control unit 100 is described with reference to FIGS. 5 to 13. Hereinafter, a control at the time of the engaging operation of the second brake 22 is described first and a control at the time of the engaging operation of the first brake 21 is described next.

1. Control at the Time of Engaging Operation of Second Brake 22

1-1. Outline

Figure 6:
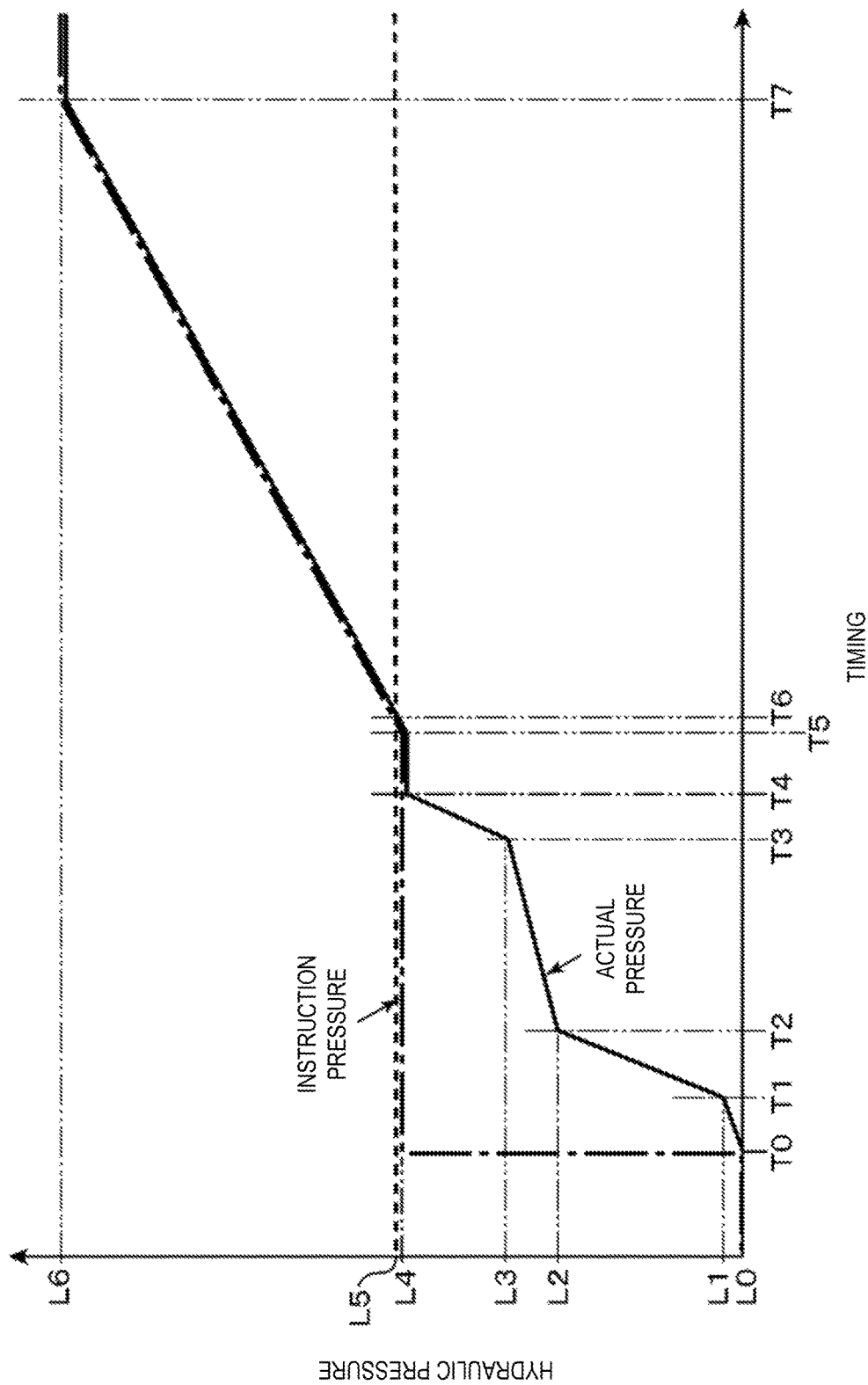
FIG. 6 is a time chart of a hydraulic pressure control executed by a hydraulic pressure controller to engage the second brake of the automatic transmission.
Figure 7:
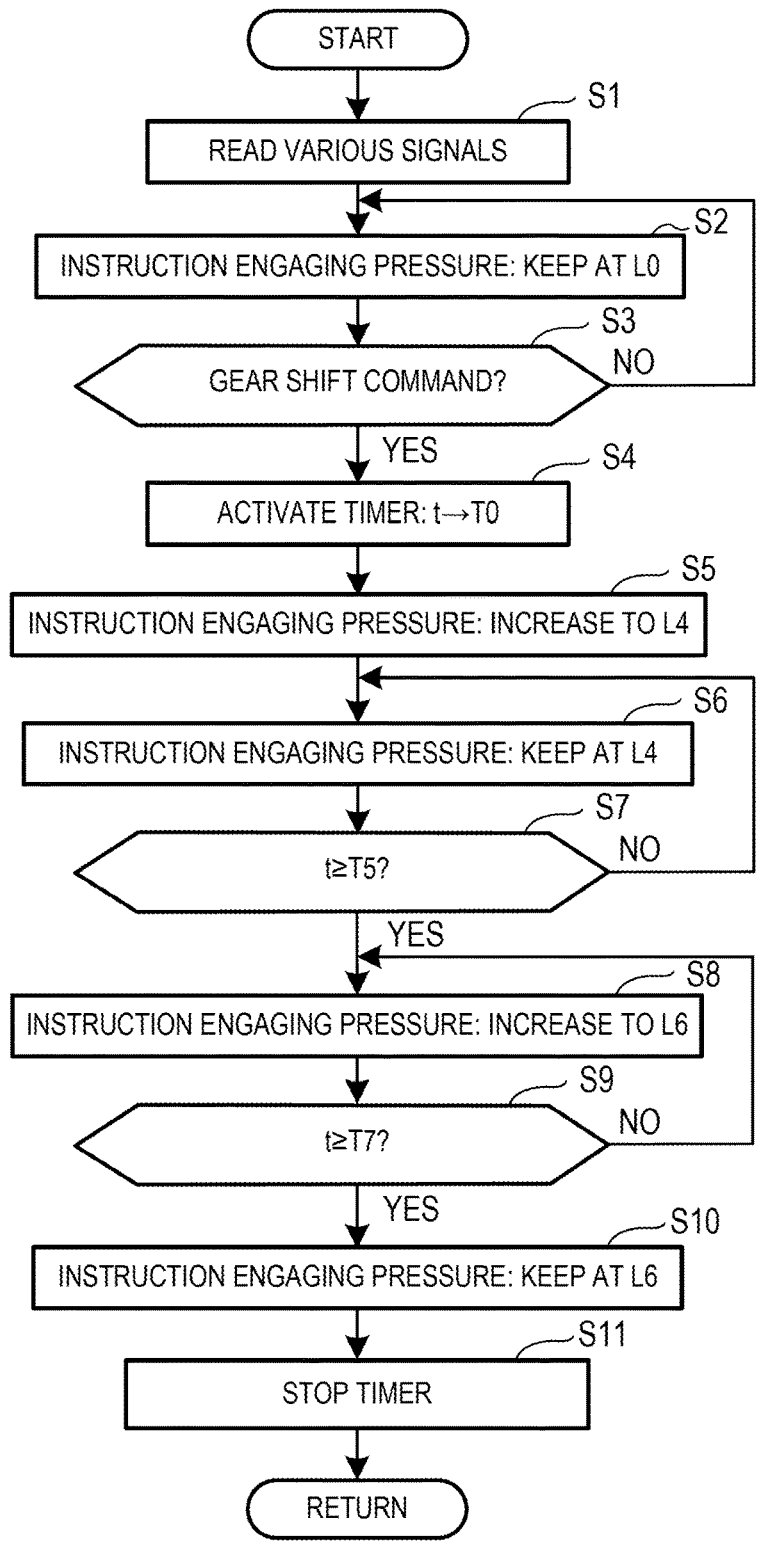
FIG. 7 is a flowchart illustrating the control of the second brake in a gear shift operation of the automatic transmission.

FIG. 6 is a time chart of the hydraulic pressure control executed by the hydraulic pressure controller 83 of the control unit 100 in the engaging operation of the second brake 22 of the automatic transmission 1. FIG. 7 is a flowchart illustrating a hydraulic pressure control operation performed by the control unit 100 of the automatic transmission 1.

First, the control unit 100 reads various signals (S1). The read signals include the vehicle speed information, the accelerator opening information, the brake information, the gear range (gear shift) information, and the oil temperature information. Here, the hydraulic pressure controller 83 instructs the linear solenoid valve 7 to keep the hydraulic pressure (engaging pressure) at a hydraulic pressure level L0, in other words, maintain the disengaged state (S2). This state corresponds to a state until a timing T0 in FIG. 6 and in which the engaging hydraulic pressure chamber 26 illustrated in FIG. 3 has little volume.

Next, if a gear shift command is issued (S3: YES) to cause the second brake 22 to change to the engaged state, the control unit 100 activates a built-in timer (S4), and the hydraulic pressure controller 83 instructs the linear solenoid valve 7 to adjust the engaging pressure to a hydraulic pressure level L4 (S5). This state still corresponds to the state at the timing T0 in FIG. 6. Whether "the gear shift command" is issued at S3 is determined based on the gear range sensor signal (P-range, R-range, N-range, or D-range), the vehicle speed sensor signal, and the accelerator opening signal.

Until the counted time by the timer reaches a timing T5 (while S7: NO), the hydraulic pressure controller 83 instructs the linear solenoid valve 7 to keep the engaging pressure at the hydraulic pressure level L4 (S6). This state corresponds to a period from the timing T0 to the timing T5 in FIG. 6 (first period).

Note that as illustrated in FIG. 6, the actual engaging pressures in the oil paths 74 and 75 extending to the frictional engageable element gradually increase to a hydraulic pressure level L1 from the timing T0 to a timing T1, and increase to a hydraulic pressure level L2 at a sharper inclination from the timing T1 to a timing T2. Then the actual engaging pressures gradually increase to a hydraulic pressure level L3 from the timing T2 to a timing T3, and then increase to the hydraulic pressure level L4 at a sharper inclination from the timing T3 to a timing T4. From the timing T4 to the timing T5, the actual engaging pressure is at the hydraulic pressure level L4 which is substantially the same as the instruction pressure.

Here, the hydraulic pressure level L4 is lower than a set pressure level L5 of the pressure reducing valve 6, in other words, a release pressure. Therefore, in the first period from the timing T0 to the timing T5, the pressure reducing valve 6 does not operate and the hydraulic pressures in the engaging hydraulic pressure chamber 26 and the disengaging hydraulic pressure chamber 27 become even.

Next, when the counted time by the timer reaches the timing T5 (S7: YES), the hydraulic pressure controller 83 instructs the linear solenoid valve 7 to increase the engaging pressure to a hydraulic pressure level L6 (S8). Note that as illustrated in FIG. 6, the pressure increase at S8 is performed gradually from the timing T5 to a timing T7, i.e., at a continuously positive inclination. At a timing T6 which is during the pressure increase, the instruction engaging pressure and the actual engaging pressure exceed the set pressure level L5 of the pressure reducing valve 6. Thus, a pressure difference is produced between the engaging hydraulic pressure chamber 26 and the disengaging hydraulic pressure chamber 27, which are described later in detail.

When the counted time by the timer reaches the timing T7 (S9: YES), the hydraulic pressure controller 83 instructs the linear solenoid valve 7 to keep the engaging pressure at the hydraulic pressure level L6 (S10). Then the control unit 100 stops the timer (S11) and terminates the series of processes of the engaging operation.

Note that, as illustrated in FIG. 6, the instruction engaging pressure from the hydraulic pressure controller 83 to the linear solenoid valve 7 increases with time from the hydraulic pressure level L4 at the timing T5 to the hydraulic pressure level L6 at the timing T7. This increase of the instruction pressure is achieved by a program stored in the hydraulic pressure controller 83 beforehand.

As further illustrated in FIG. 6, the pressure increasing process from the timing T5 to the timing T7 is performed such that the actual engaging pressure substantially matches with the instruction engaging pressure.

In this embodiment, the instruction engaging pressure from the hydraulic pressure controller 83 is kept at the hydraulic pressure level L4 in the first period, and the instruction engaging pressure is increased from the hydraulic pressure level L4 to the hydraulic pressure level L6 in a second period from the timing T5 to the timing T7. Thus, the change of the instruction pressure in the second period is larger than that of the instruction pressure in the first period.

Note that although the instruction pressure in the first period is kept at the hydraulic pressure level L4 in this embodiment, it may vary at a given inclination. Also in this case, the change of the instruction pressure in the second period is larger than that of the instruction pressure in the first period.

1-2. Details of Engaging Operation

The engaging operation of the second brake 22 is described in detail with reference to FIGS. 8 to 11.

Figure 8:
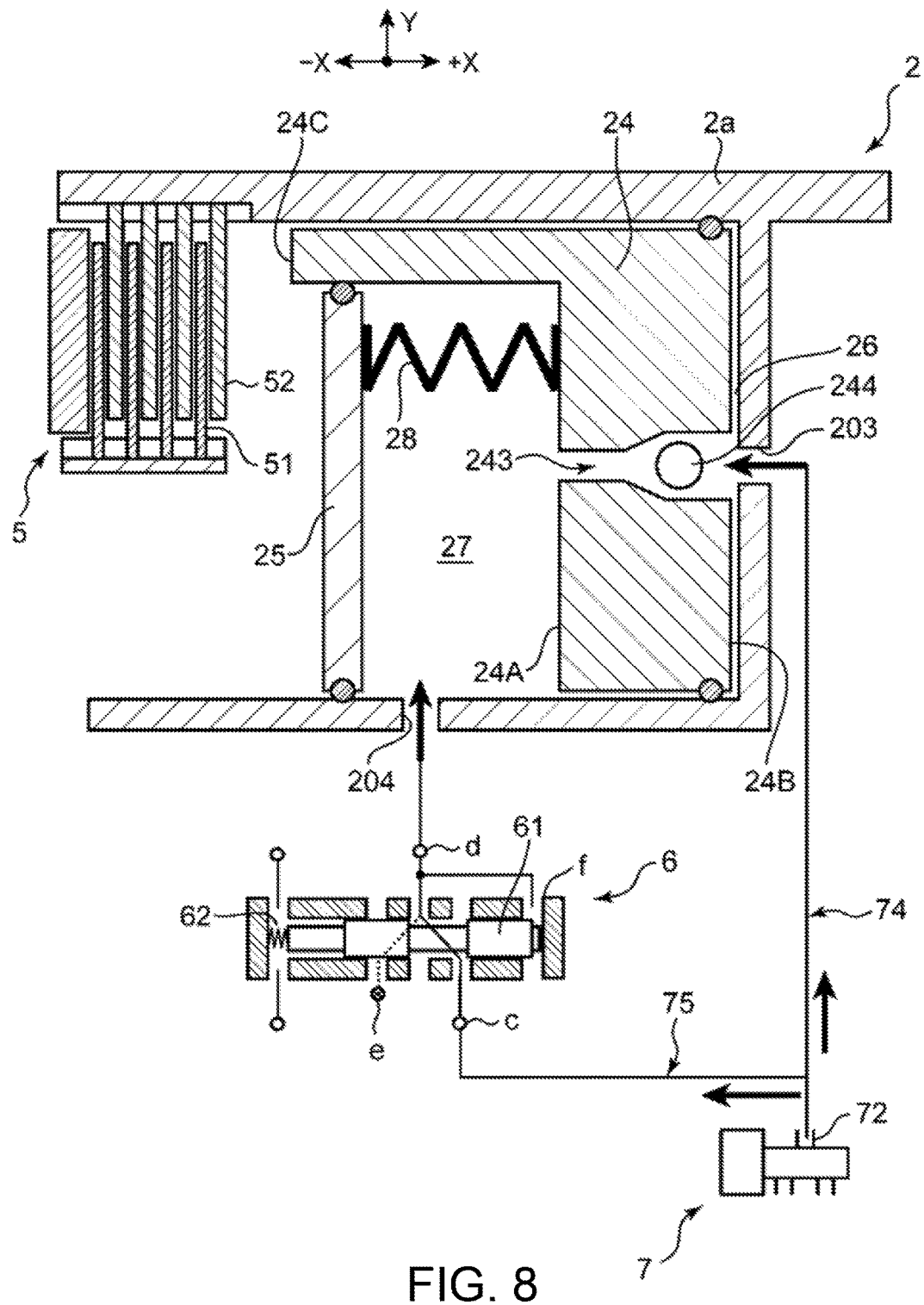
FIG. 8 is a cross-sectional view schematically illustrating the engaging operation of the second brake in the gear shift operation of the automatic transmission.

The state of the second brake 22 illustrated in FIG. 8 indicates the state around (before and after) the timing T0 in FIG. 6. The state before the timing T0 is a standby state where hydraulic pressure is not yet supplied to the engaging hydraulic pressure chamber 26 and the disengaging hydraulic pressure chamber 27 through the linear solenoid valve 7. Here, the piston 24 is pushed in the +X direction by the biasing force of the return spring 28 without receiving influence of hydraulic pressure, and located at the disengaging position. The tip end surface 24C of the piston 24 is separated from the friction plate unit 5 by a given distance, and the drive plates 51 and the driven plates 52 of the friction plate unit 5 are disengaged from each other. Due to the movement of the piston 24 in the +X direction, the engaging hydraulic pressure chamber 26 has the smallest volume, whereas the volume of the disengaging hydraulic pressure chamber 27 becomes the largest volume.

Note that in FIG. 8, for easier understanding of the structure, the second surface 24B of the piston 24 is slightly separated from the first wall portion 201 of the transmission case 2 in the −X direction; however, it may actually be in contact with the first wall portion 201.

Next, when the hydraulic pressure controller 83 instructs the linear solenoid valve 7 to increase the engaging pressure to the hydraulic pressure level L4 at the timing T0, as indicated by the thick arrows at the first and second oil paths 74 and 75 illustrated in FIG. 8, the hydraulic oil is started to flow into the engaging hydraulic pressure chamber 26 and the disengaging hydraulic pressure chamber 27. For example, the hydraulic pressure controller 83 controls the input and output ports 71 and 72 of the linear solenoid valve 7 to communicate with each other so that the hydraulic oil discharged from the oil pump 81 flows through the first and second oil paths 74 and 75. The hydraulic oil is started to flow from the common output port 72 of the linear solenoid valve 7 into the engaging hydraulic pressure chamber 26 through the first oil path 74, at the same time, into the disengaging hydraulic pressure chamber 27 through the upstream oil path 751 of the second oil path 75, the pressure reducing valve 6, and the downstream oil path 752. Here, the pushing force for the piston 24 is not hydraulically produced yet, and the piston 24 is located at its end position on the +X side due to the biasing force of the return spring 28.

At the timing T0, the input and output ports c and d of the pressure reducing valve 6 are communicated with each other by the biasing force of the return spring 62. This is because the hydraulic pressure level L4 is set lower than the set pressure level L5 which is the release pressure of the pressure reducing valve 6.

Figure 9:
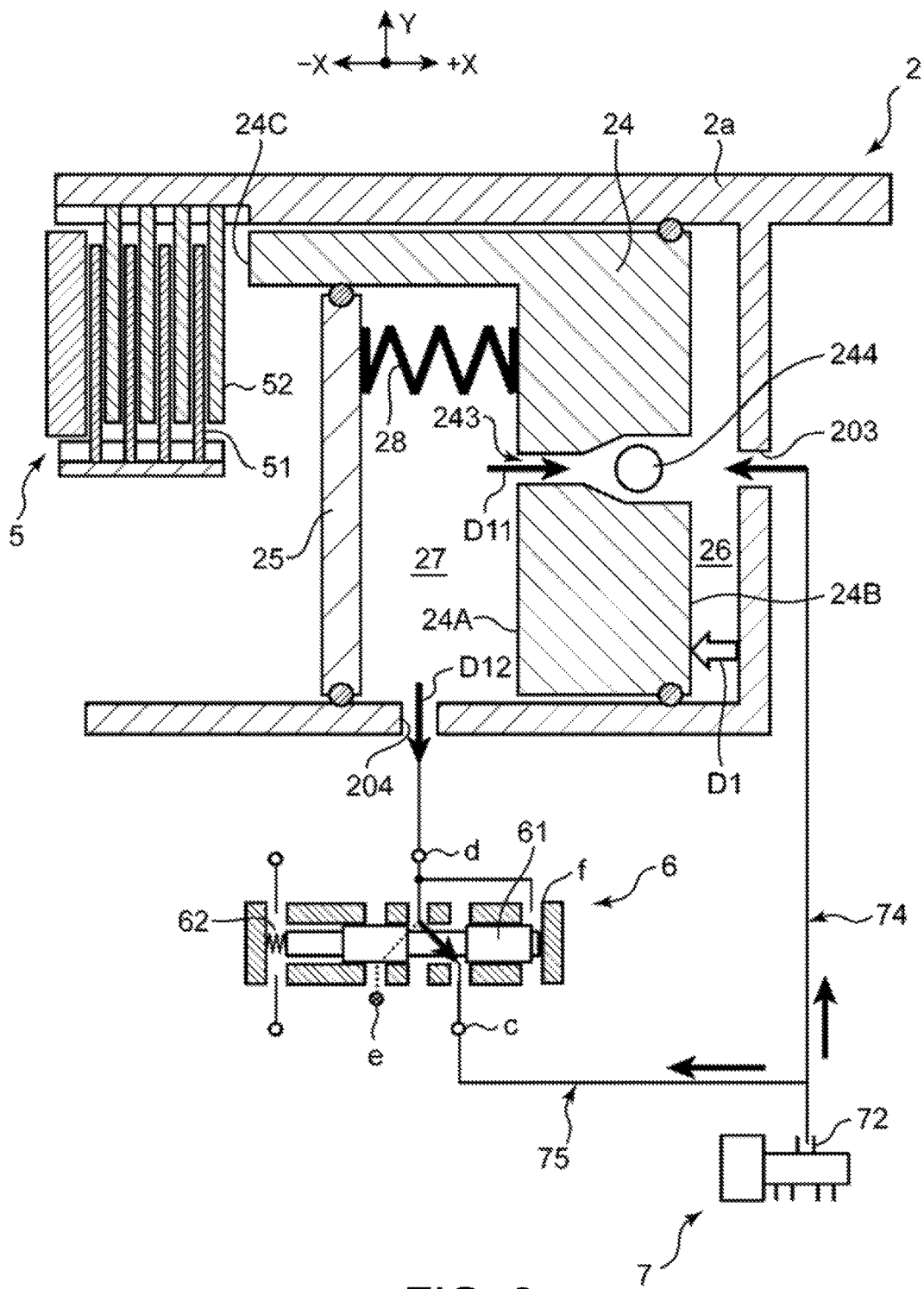
FIG. 9 is a cross-sectional view schematically illustrating the engaging operation of the second brake in the gear shift operation of the automatic transmission.

Next, the state of the second brake 22 illustrated in FIG. 9 indicates the state where the engaging hydraulic pressure chamber 26 and the disengaging hydraulic pressure chamber 27 are filled with the hydraulic oil after being started to flow as illustrated in FIG. 8, and the piston 24 moves in the −X direction. As illustrated in FIG. 9, also when the same level of hydraulic pressure is supplied to the engaging hydraulic pressure chamber 26 and the disengaging hydraulic pressure chamber 27, the piston 24 moves based on the pressure receiving area difference between the first and second surfaces 24A and 24B. Since the pressure receiving area of the second surface 24B of the piston 24 is larger than that of the first surface 24A as described above, a pushing force D1 acts on the piston 24 in the −X direction according to the pressure receiving area difference. In other words, pushing force D1=(hydraulic pressure×(area of section B−area of section A). Thus, the piston 24 is moved in the −X direction by the pushing force D1. Note that since the pushing force D1 needs to overtake the biasing force of the return spring 28 in +X direction, the pressure receiving area difference is set in consideration of the biasing force of the return spring 28.

When the piston 24 moves in the −X direction, the hydraulic pressure inside the disengaging hydraulic pressure chamber 27 increases. Since the piston 24 is in an early stage of the process of moving in the −X direction, the volume of the disengaging hydraulic pressure chamber 27 is relatively large and contains a large amount of hydraulic oil. Therefore, as indicated by the arrow D11 of FIG. 9, the hydraulic oil in the disengaging hydraulic pressure chamber 27 flows into the engaging hydraulic pressure chamber 26 through the through-hole 243 according to the movement of the piston 24 in the −X direction. Thus, the balance in the hydraulic pressure between the engaging hydraulic pressure chamber 26 and the disengaging hydraulic pressure chamber 27 is substantially maintained.

Note that as indicated by the arrow D12, hydraulic oil may reverse back into the second oil path 75 depending on the level of hydraulic pressure inside the disengaging hydraulic pressure chamber 27.

Since the engaging hydraulic pressure chamber 26 receives the hydraulic oil from the disengaging hydraulic pressure chamber 27 as described above, only a small amount of hydraulic oil is required to be supplied to the engaging hydraulic pressure chamber 26 through the first oil path 74. In other words, only the hydraulic oil at the flow rate high enough to produce the pushing force D1 based on the pressure receiving area difference is required to be supplied through the linear solenoid valve 7. Therefore, high hydraulic responsiveness is obtained in moving the piston 24 in the −X direction. As the piston 24 moves, the tip end surface 24C approaches the friction plate unit 5 and the return spring 28 is gradually compressed.

Figure 10:
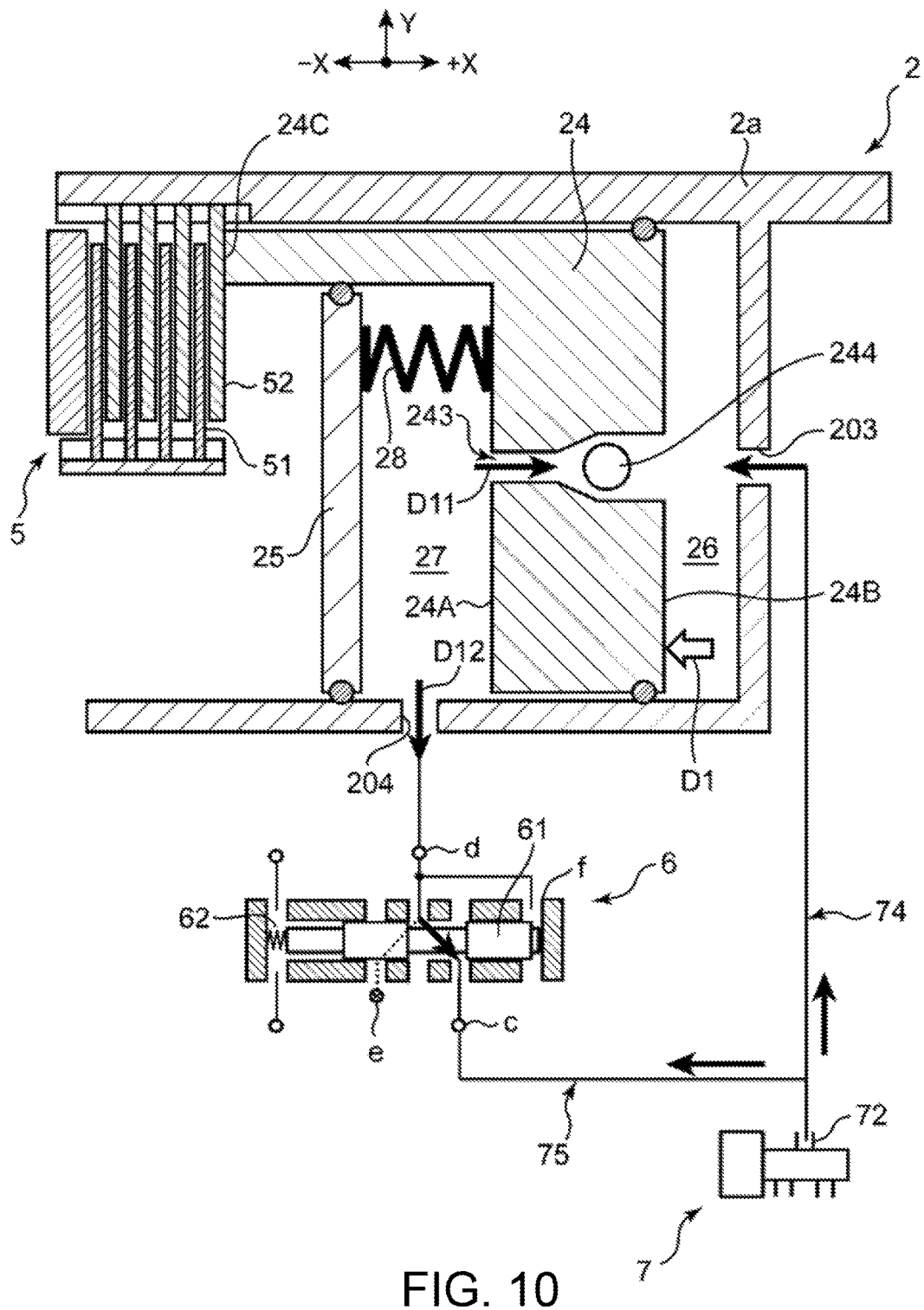
FIG. 10 is a cross-sectional view schematically illustrating the engaging operation of the second brake in the gear shift operation of the automatic transmission.

The state of the second brake 22 illustrated in FIG. 10 indicates the state at or immediately before the timing T5. The piston 24 moves in the −X direction and the tip end surface 24C is located at the position (engaging position) contacting with the friction plate unit 5 (driven plate 52), i.e., the zero touch state for friction plates 51, 52. Even in this state, only the pushing force D1 based on the pressure receiving area difference acts on the second surface 24B of the piston 24 and the flows of oil indicated by the arrows D11 and D12 occur, similar to the state of FIG. 9.

As the tip end surface 24C contacts with the friction plate unit 5 and the piston 24 pushes the friction plate unit 5, the clearance between the drive plates 51 and the driven plates 52 is closed and eventually a frictional engaging force is produced between the plates 51 and 52. Also at this point, only the pushing force D1 described above contributes in the pushing of the piston 24. Therefore, the drive plates 51 and the driven plates 52 are engaged by a light engaging pressure in the early stage of the engagement, which contributes in reducing an engaging shock of the friction plate unit 5.

Figure 11:
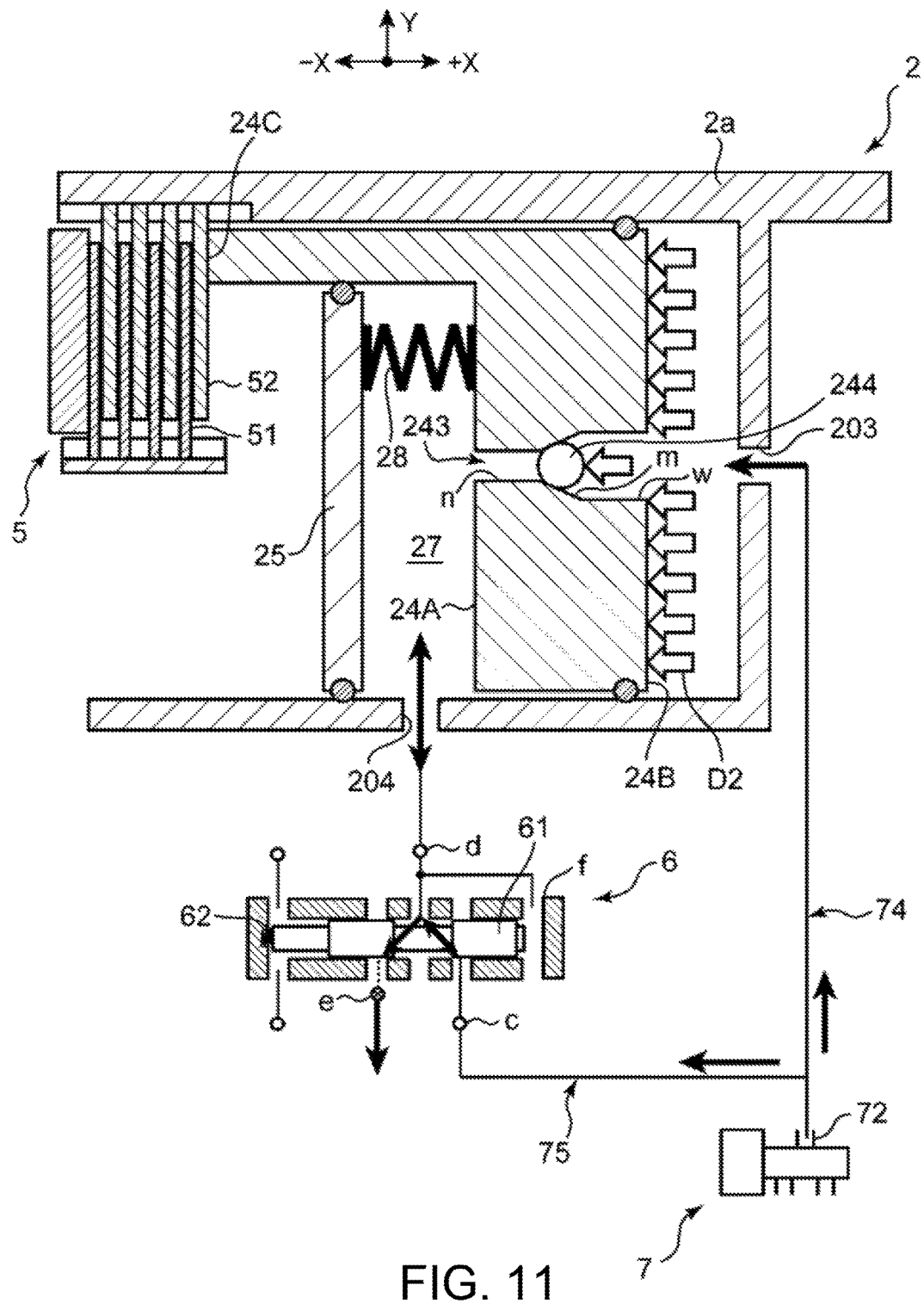
FIG. 11 is a cross-sectional view schematically illustrating the engaging operation of the second brake in the gear shift operation of the automatic transmission.

The state of the second brake 22 illustrated in FIG. 11 indicates the state where the instruction engaging pressure and the actual engaging pressure in the second period is at or above the hydraulic pressure level L5, and the friction plate unit 5 is engaged at a given engaging pressure. In this state, the hydraulic pressure controller 83 controls the linear solenoid valve 7 to discharge a given engaging hydraulic pressure (line pressure) from the output port 72. Thus, the engaging hydraulic pressure is suppliable to the engaging hydraulic pressure chamber 26 and the disengaging hydraulic pressure chamber 27 through the first and second oil paths 74 and 75.

Here, once the actual engaging pressure reaches the set pressure, the pressure reducing valve 6 starts the pressure limiting operation to adjust the hydraulic pressure of the disengaging hydraulic pressure chamber 27 to fall below a given pressure (lower than the hydraulic pressure of the engaging hydraulic pressure chamber 26). For example, when the hydraulic pressure of the disengaging hydraulic pressure chamber 27 increases and the feedback port f of the pressure reducing valve 6 receives hydraulic pressure overtaking the biasing force of the return spring 62, the spool 61 is moved in the −X direction by the hydraulic pressure and the output port d communicates with the drain port e. Therefore, the hydraulic pressure of the disengaging hydraulic pressure chamber 27 is maintained below the certain pressure. Thus, only the engaging hydraulic pressure chamber 26 is pressurized.

By having the pressure inside the engaging hydraulic pressure chamber 26 higher than that inside the disengaging hydraulic pressure chamber 27, the pressure ball 244 moves in the −X direction and blocks the through-hole 243. Therefore, the movements of the hydraulic oil in both directions between the engaging hydraulic pressure chamber 26 and the disengaging hydraulic pressure chamber 27 are restricted. Thus, a large pushing force D2 acts on the piston 24 in the −X direction according to the difference between the engaging hydraulic pressure (the hydraulic pressure of the engaging hydraulic pressure chamber 26) and the disengaging hydraulic pressure (the hydraulic pressure of the disengaging hydraulic pressure chamber 27) and to the pressure receiving area difference. In other words, the pushing force D2=((hydraulic pressure of engaging hydraulic pressure chamber 26)×(area of section B)−(hydraulic pressure of disengaging hydraulic pressure chamber 27)×(area of section A)).

Thus, since the pushing force D2 is larger than the pushing force D1 based on the pressure receiving area difference is applied, the piston 24 is pushed in the −X direction with a stronger force. This pushing force D2 is given to the friction plate unit 5 via the tip end surface 24C. Therefore, the friction plate unit 5 is engaged at a given brake engaging pressure.

Note that the pushing forces D1 and D2 are set by also taking into consideration the pushing force of the return spring 28 in the +X direction.

2. Control at the Time of Engaging Operation of First Brake 21

Figure 12:
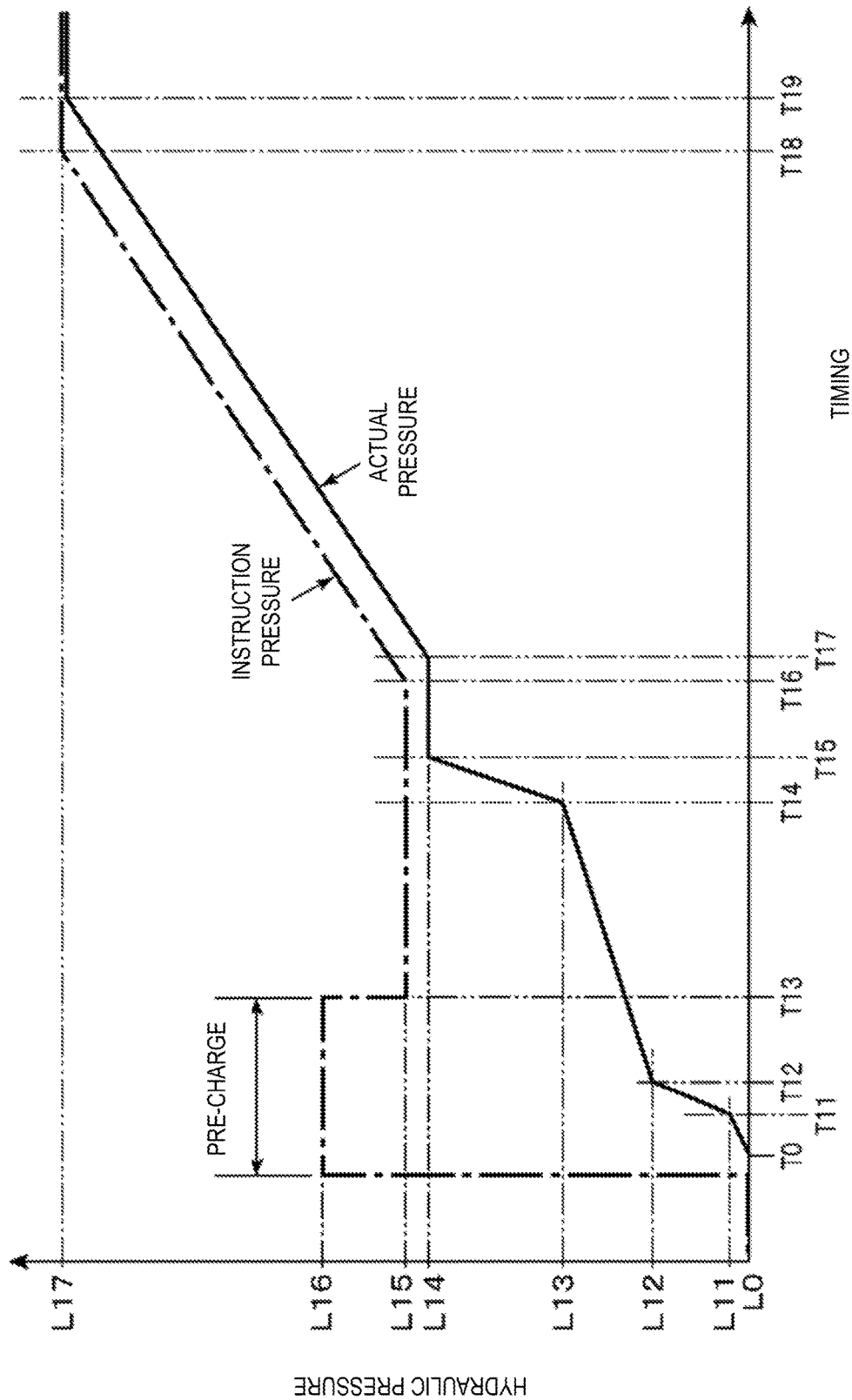
FIG. 12 is a time chart of a hydraulic pressure control executed by the hydraulic pressure controller to engage the first brake of the automatic transmission.
Figure 13:
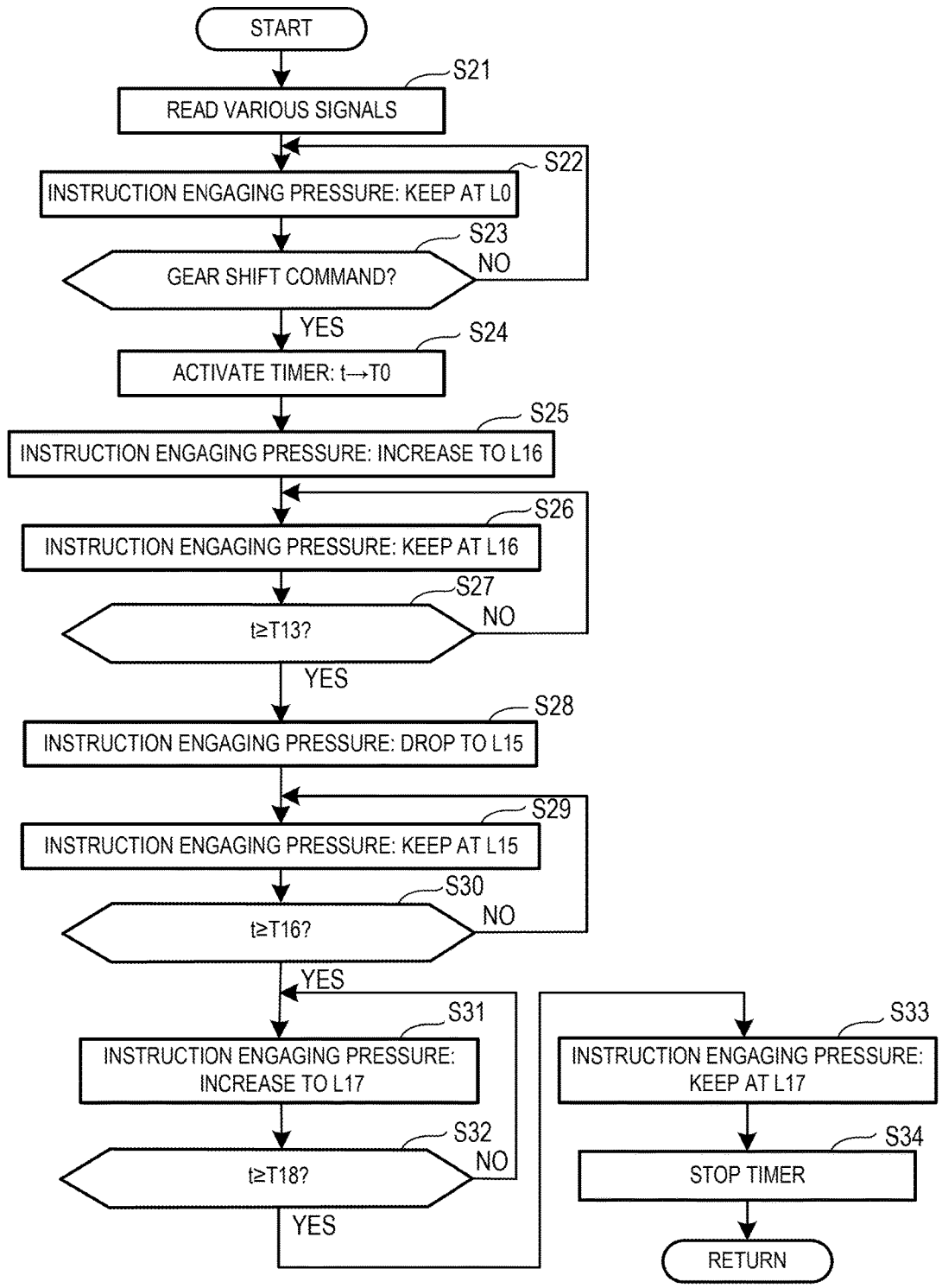
FIG. 13 is a flowchart illustrating the control of the first brake in the gear shift operation of the automatic transmission.

FIG. 12 is a time chart of a hydraulic pressure control executed by the hydraulic pressure controller 83 of the control unit 100 to engage the first brake 21 of the automatic transmission 1. FIG. 13 is a flowchart illustrating a hydraulic pressure control executed by the control unit 100.

First, the control unit 100 reads various signals (S21). The read signals include the vehicle speed information, the accelerator opening information, the brake information, the gear range (gear shift) information, and the oil temperature information. Here, the hydraulic pressure controller 83 instructs the linear solenoid valve 108 to keep the hydraulic pressure (engaging pressure) at a hydraulic pressure level L0, in other words, maintain the disengaged state (S22). This state corresponds to a state until a timing T0 in FIG. 12 and the engaging hydraulic pressure chamber 213 illustrated in FIG. 4 has little volume.

Next, if a gear shift command is issued (S23: YES) to cause the first brake 21 to change to the engaged state, the control unit 100 activates the built-in timer (S24), and the hydraulic pressure controller 83 instructs the linear solenoid valve 108 to increase the engaging pressure to a hydraulic pressure level L16 (S25). This state still corresponds to the state at the timing T0 in FIG. 12. Note that whether "the gear shift command" is issued at S23 is determined based on the gear range sensor signal (P-range, R-range, N-range, or D-range), the vehicle speed sensor signal, and the accelerator opening signal.

Until the counted time by the timer reaches a timing T13 (while S27: NO), the hydraulic pressure controller 83 instructs the linear solenoid valve 108 to keep the engaging pressure at the hydraulic pressure level L16 (S26). This control is referred to as a pre-charging process. This state corresponds to a period from the timing T0 to the timing T13 in FIG. 12. Once the counted time by the timer reaches the timing T13 (S27: YES), the hydraulic pressure controller 83 instructs the linear solenoid valve 108 to drop the engaging pressure to a hydraulic pressure level L15 (S28). As illustrated in FIG. 12, the pre-charging process is executed in the first brake 21 for the period from the timing T0 to the timing T13.

Next, from the timing T13 to a timing T16 (S30: NO), the hydraulic pressure controller 83 instructs the linear solenoid valve 108 to maintain the hydraulic pressure level L15 (S29). This control of the first brake 21 from the timing T13 to the timing T16 is referred to as the low-pressure maintaining process. Note that the instruction pressure in the low-pressure maintaining process is at the hydraulic pressure level L15, and this is lower than the hydraulic pressure level L16 which is the highest instruction pressure (highest target value) in the pre-charging process.

Here, as illustrated in FIG. 12, the actual engaging pressure in the third oil path 76 extending to the first brake 21 gradually increases from the timing T0 to a timing T11, and then increases at a sharper inclination from the timing T11 to a timing T12. Then the increase speed of the actual engaging pressure increases more gradually from the timing T12 to a timing T14 and the actual engaging pressure increases at a sharper inclination from the timing T14 to a timing T15. From the timing T15 to a timing T17, the actual engaging pressure is at a hydraulic pressure level L14 which is substantially the same as or slightly lower than the instruction pressure.

Next, if the counted time by the timer reaches the timing T16 (S30: YES), the hydraulic pressure controller 83 instructs the linear solenoid valve 108 to increase the engaging pressure to a hydraulic pressure level L17 (S31). Note that as illustrated in FIG. 12, the pressure increase at S31 is also performed gradually from the timing T16 to a timing T18, i.e., at a positive inclination.

If the counted time by the timer reaches the timing T18 (S32: YES), the hydraulic pressure controller 83 instructs the linear solenoid valve 108 to keep the engaging pressure at the hydraulic pressure level L17 (S33). Then the control unit 100 stops the timer (S34) and terminates the series of processes of the engaging operation. The control of the first brake 21 from the timing T16 to the timing T18 is referred to as the pressure increasing process.

Note that as illustrated in FIG. 12, the instruction engaging pressure by the hydraulic pressure controller 83 to the linear solenoid valve 108 also increases with time from the hydraulic pressure level L15 at the timing T16 to the hydraulic pressure level L17 at the timing T18. This increase of the instruction pressure is also achieved by a program stored in the hydraulic pressure controller 83 beforehand.

As further illustrated in FIG. 12, the pressure increasing process from the timing T16 is performed such that the actual engaging pressure increases with a slight delay with respect to the instruction timing of the engaging pressure and reaches the hydraulic pressure level L17 at a timing T19.

3. Comparison Between Controls of Engaging Operations of Second Brake 22 and First Brake 21

As illustrated in FIG. 6, the control of the engaging operation of the second brake 22 does not include "the pre-charging process" in the first period. In the first period, the instruction engaging pressure is kept at the hydraulic pressure level L4 (given value). When comparing FIG. 6 with FIG. 12, the length of the first period from the timing T0 to the timing T5 in the engaging operation of the second brake 22 is shorter than the period from the timing T0 to the timing T16 in the engaging operation of the first brake 21 (the execution period of the pre-charging process+the execution period of the low-pressure maintaining process).

In the engaging operation of the second brake 22, since the hydraulic oil of the disengaging hydraulic pressure chamber 27 moves to the engaging hydraulic pressure chamber 26 as the piston 24 moves in the first period, only a small amount of hydraulic oil is required to be supplied to the engaging hydraulic pressure chamber 26 from the linear solenoid valve 7.

Supplemental Description Regarding Instruction Pressure Setting

The setting of the instruction pressure from the hydraulic pressure controller 83 to the linear solenoid valve is supplementarily described with reference to FIGS. 14A and 14B.

Figure 14A:
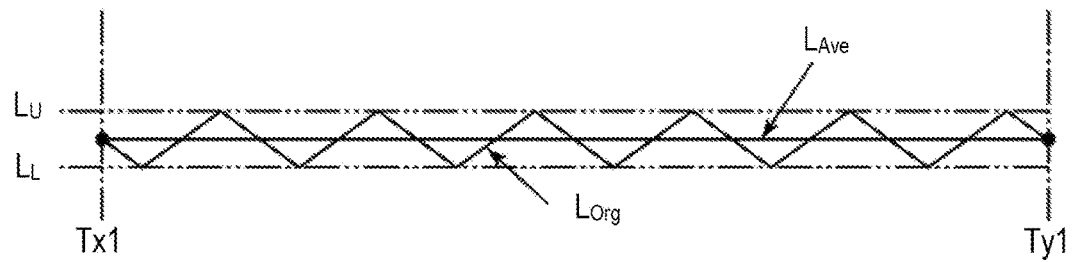
FIGS. 14A and 14B are schematic diagrams illustrating settings of an instruction pressure.

FIG. 14A schematically illustrates the instruction pressure in the first period in FIG. 6. The instruction to the linear solenoid valve from the hydraulic pressure controller 83 is performed by, for example, a current control. Therefore, as illustrated in FIG. 14A, an actual instruction pressure $L_{Org}$ between a timing Tx1 and a timing Ty1 varies between a value $L_L$ and a value $L_U$. In this embodiment, the instruction pressure $L_{Org}$ with such a variation is described as an instruction pressure $L_{Ave}$ which is an average value of the varying instruction pressure $L_{Org}$.

Note that the instruction pressure in the period from the timing T13 to the timing T16 (the execution period of the low pressure maintaining process) illustrated in FIG. 12 also has a variation similar to above.

Figure 14B:
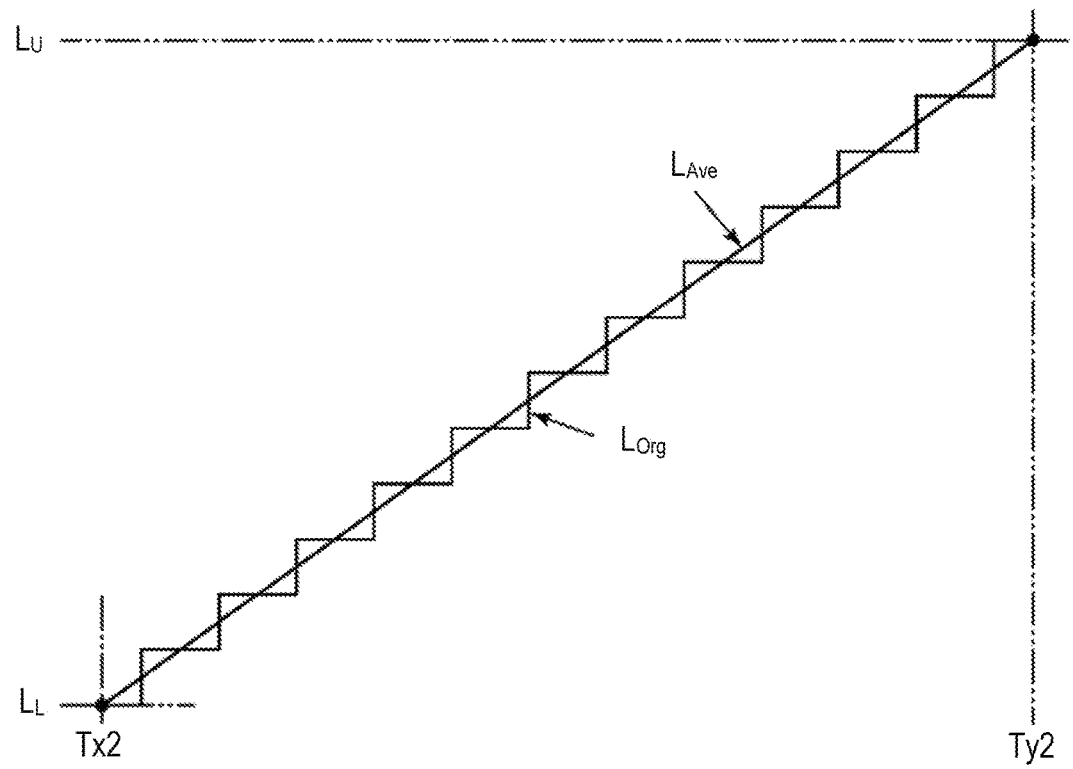

FIG. 14B schematically illustrates the instruction pressure in the second period in FIG. 6. As illustrated in FIG. 14B, the actual instruction pressure $L_{Org}$ between a timing Tx2 and a timing Ty2 increases from the value $L_L$ to the value $L_U$ in a stepwise fashion. In this embodiment, such an actual instruction pressure $L_{Org}$ is described as an instruction pressure $L_{Ave}$ which is a regression line (linear regression line in FIG. 14B).

Note that the instruction pressure in the period from the timing T16 to the timing T18 (the execution period of the pressure increasing process) illustrated in FIG. 12 changes similar to above.

The instruction pressure in the second period may be expressed by a curved regression line depending on the mode of the actual instruction pressure.

Operations and Effects

According to the control method of the engaging operation of the second brake 22 of this embodiment, the instruction for maintaining the hydraulic pressure level L4 is outputted to the linear solenoid valve 7 in the first period in response to the gear shift command. In other words, according to this control method, "the pre-charging process" is not provided to the control of the engaging operation. Therefore, the time of the engagement control of the second brake 22 is shortened and the control is simplified compared to the first brake 21 provided with the pre-charging process in its control of the engaging operation.

Moreover, in a case of employing the pre-charging in the engagement control, a so-called pre-charge learning (a feedback of a pre-charging time) is required and complicates the control, whereas in the control method of the engaging operation of the second brake 22 which does not employ the pre-charging process, such a pre-charge learning is not required.

Note that as is apparent from FIG. 6, in this embodiment, "the first period in response to the gear shift command" means "immediately after the issuance of the gear shift command," which means that the timing T0 which is the received timing of the gear shift command is the start timing of the first period and another process does not intervene between the issuance and the timing T0.

Moreover, according to the control method of the engaging operation of the second brake 22, the following operations and effects are obtained in combination with the structure of the second brake 22 illustrated in FIG. 3. The second brake 22 is attached with the linear solenoid valve 7 commonly used for the engaging hydraulic pressure chamber 26 and the disengaging hydraulic pressure chamber 27. The automatic transmission 1 further includes the first oil path 74 communicating the output port 72 of the linear solenoid valve 7 with the engaging hydraulic pressure chamber 26, and the second oil path 75 communicating the output port 72 with the disengaging hydraulic pressure chamber 27. When causing the friction plate unit 5 to change from the disengaged state to the engaged state, hydraulic pressure is supplied from the output port 72 simultaneously to the engaging hydraulic pressure chamber 26 and the disengaging hydraulic pressure chamber 27 though the first and second oil paths 74 and 75, respectively.

In the above structure, the hydraulic pressure receiving area of the second surface 24B of the piston 24 is set larger than that of the first surface 24A. Therefore, even when the hydraulic pressure supplied to the first surface 24A from the disengaging hydraulic pressure chamber 27 is the same as the hydraulic pressure supplied to the second surface 24B from the engaging hydraulic pressure chamber 26, the piston 24 is moved in the engaging direction (−X direction) by the pushing force D1 according to the pressure receiving area difference which corresponds to the section of the second surface 24B larger than that of the first surface 24A. When changing from the disengaged state to the engaged state, since the piston 24 is moved by the weak pushing force D1 corresponding to the pressure receiving area difference, the engaging shock of the friction plate unit 5 is reduced. Moreover, a complicated hydraulic pressure control for the engaging shock reduction is unnecessary. That is, a complicated control for reducing the flow rate of the hydraulic oil immediately before a completion of a piston stroke is avoided, and thus the engagement control time is shortened.

Since the piston 24 includes the through-hole 243 communicating the engaging hydraulic pressure chamber 26 with the disengaging hydraulic pressure chamber 27, when the pressure of the disengaging hydraulic pressure chamber 27 increases, the hydraulic oil flows into the engaging hydraulic pressure chamber 26 through the through-hole 243. Therefore, when moving the piston 24 in the engaging direction, the engaging hydraulic pressure chamber 26 receives the hydraulic oil from the disengaging hydraulic pressure chamber 27. Thus, only a small amount of hydraulic oil is required to be supplied to the engaging hydraulic pressure chamber 26 through the first oil path 74. In other words, only the hydraulic oil for producing the pushing force D1 based on the pressure receiving area difference is required to be supplied to the engaging hydraulic pressure chamber 26 through the linear solenoid valve 7.

Therefore, in the second brake 22 of this embodiment, since the piston 24 moves with the small amount of oil, the responsiveness in engaging the friction plate unit 5 is improved. This improvement is advantageously exerted even when the clearance C between the drive plates 51 and the driven plates 52 is widened in order to reduce a so-called drag resistance of the friction plate unit 5. Thus, even when the required moving distance of the piston 24 for the frictional engagement is increased, only a small amount of oil is required to flow into the engaging hydraulic pressure chamber 26 from the first oil path 74, which prevents the responsiveness for the frictional engagement from lowering. As a result, both the reduction in the drag resistance and the improvement in the responsiveness of the frictional engagement are achieved.

The pressure ball 244 for restricting the oil flow between the engaging hydraulic pressure chamber 26 and the disengaging hydraulic pressure chamber 27 is disposed in the through-hole 243 bored in the piston 24 of the second brake 22. The pressure ball 244 blocks the through-hole 243 when needed, to prohibit the flow of the hydraulic oil between the engaging hydraulic pressure chamber 26 and the disengaging hydraulic pressure chamber 27. Thus, the engaging hydraulic pressure chamber 26 and the disengaging hydraulic pressure chamber 27 are hydraulically separated from each other and cause the large pushing force D2 to act on the piston 24 in the engaging direction.

The second oil path 75 attached to the second brake 22 includes the pressure reducing valve 6 for preventing the hydraulic pressure of the disengaging hydraulic pressure chamber 27 from exceeding the given value. The pressure reducing valve 6 adjusts the hydraulic pressure of the disengaging hydraulic pressure chamber 27 at or below the set pressure of the pressure reducing valve 6 to achieve the smooth movement of the piston 24 in the engaging direction (−X direction). For example, after the piston 24 contacts with the friction plate unit 5 and the clearance C between the plates 51 and 52 is closed, the given engaging hydraulic pressure is supplied to the engaging hydraulic pressure chamber 26 through the first oil path 74, while adjusting the hydraulic pressure of the disengaging hydraulic pressure chamber 27 by the pressure reducing valve 6. Thus, the piston 24 is smoothly moved to the engaging position.

Since the linear solenoid valve 7 is attached to the second brake 22 as the hydraulic pressure control valve for the engaging hydraulic pressure chamber 26 and the disengaging hydraulic pressure chamber 27, the oil supply amount is adjusted corresponding to the power distribution amount to the solenoid coil of the linear solenoid valve 7 and a highly accurate hydraulic pressure control is achieved.

On the other hand, the control method of the engaging operation of the first brake 21 includes the pre-charging process. By employing such a control method, the second brake 22 is reduced in the manufacturing cost and size. Thus, as illustrated in FIG. 4, a pressure reducing valve and an oil path attached thereto are not required for the first brake 21, and the hydraulic system is simplified. Further in the first brake 21, the third and fourth surfaces 212A and 212B of the piston 212 are not required to have different pressure receiving areas and have a high degree of freedom in design. Moreover, the piston 212 is not required to have a through-hole or a restricting mechanism. Thus, reductions in the manufacturing cost and size are achieved.

Note that, in consideration of the relationship between the size and the manufacturing cost of the automatic transmission 1, a configuration and control method similar to those of the second brake 22 may be adopted to the first brake 21 and the configurations and control methods of the first and second brakes 21 and 22 may suitably be interchanged.

The volume of the engaging hydraulic pressure chamber 213 of the first brake 21 in the engaged state may be smaller than the volume of the engaging hydraulic pressure chamber 26 of the second brake 22 in the engaged state, so as to reduce the automatic transmission 1 in size.

Another Embodiment

In the above embodiment, among the frictional engageable elements of the automatic transmission 1, the first and second brakes 21 and 22 are described for their configurations and controls. In the following embodiment, configurations of the first and second clutches 31 and 32 are described as other examples of the frictional engageable elements provided to the automatic transmission 1.

1. First Clutch 31

Figure 15:
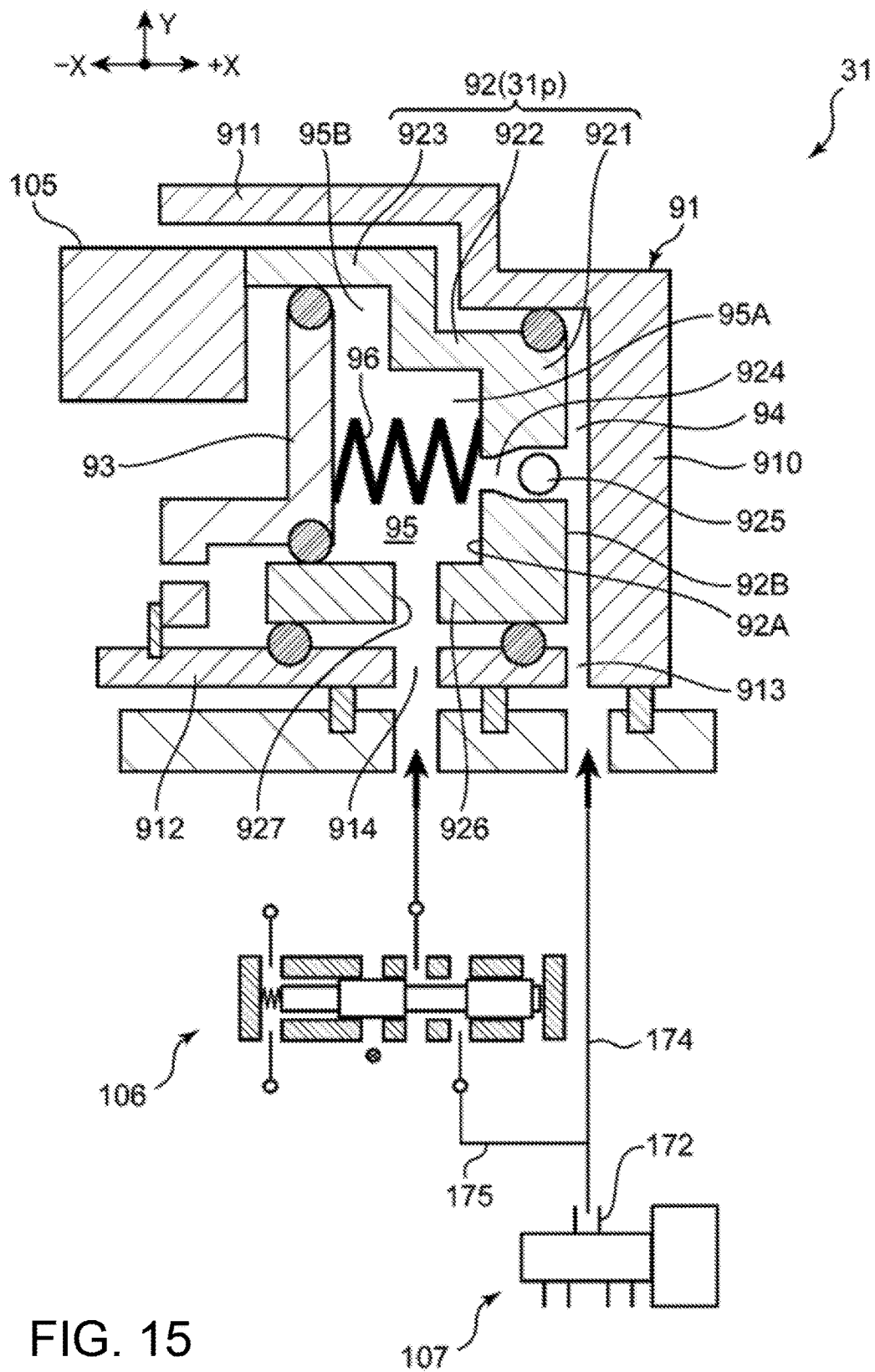
FIG. 15 is a view illustrating a schematic cross section of a structure of a first clutch which is one of the frictional engageable elements of the automatic transmission, and illustrating a part of a configuration of a hydraulic mechanism of the first clutch.

FIG. 15 is a view schematically illustrating a configuration of the first clutch 31 which is one of the frictional engageable elements of the automatic transmission 1.

As illustrated in FIG. 15, the first clutch 31 includes a drum 91, a piston 92, a sealing ring 93, an engaging hydraulic pressure chamber 94, and a disengaging hydraulic pressure chamber 95. The first clutch 31 engages and disengages a friction plate unit 105. A pressure reducing valve 106 and a linear solenoid valve 107 are applied as a hydraulic mechanism of the first clutch 31. The pressure reducing valve 106 and the linear solenoid valve 107 have the same structures as those of the pressure reducing valve 6 and the linear solenoid valve 7 of the second brake 22.

The drum 91 is supported by the transmission case 2 to be rotatable about a center axis of the automatic transmission 1. The drum 91 includes a circular plate part 910 extending in the Y directions, an outer cylindrical part 911 extending from a radially outer edge of the circular plate part 910 and having a larger diameter than the circular plate part 910, and an inner cylindrical part 912 coaxially disposed on the inner side of the outer cylindrical part 911. The inner cylindrical part 912 is formed with a first supply port 913 and a second supply port 914 for a hydraulic pressure supply.

The piston 92 is a member corresponding to the piston 31p illustrated in FIG. 1, and includes a pressure receiving part 921, a small cylindrical part 922, and a large cylindrical part 923. The pressure receiving part 921 has a first surface 92A on the friction plate unit 105 side and a second surface 92B on the opposite side from the first surface 92A, and the both surfaces receive hydraulic pressure. The pressure receiving part 921 includes a through-hole 924 penetrating in the axial directions, a pressure ball 925 is disposed inside the through-hole 924. An inner cylindrical part 926 projects from a radially inner edge of the pressure receiving part 921 and extends in the −X direction. The inner cylindrical part 926 is bored a third supply port 927 communicating with the second supply port 914. An edge of the large cylindrical part 923 on the −X side pushes the friction plate unit 105. The sealing ring 93 is disposed between the piston 92 and the friction plate unit 105 and blocks a gap between the large cylindrical part 923 and the inner cylindrical part 926.

The engaging hydraulic pressure chamber 94 (hydraulic oil pressure chamber) is space between (the second surface 92B side of) the pressure receiving part 921 of the piston 92 and the circular plate part 910 of the drum 91, and receives hydraulic pressure from a first oil path 174 through the first supply port 913. The disengaging hydraulic pressure chamber 95 (centrifugal balance hydraulic pressure chamber) is space defined by (the first surface 92A side of) the pressure receiving part 921 of the piston 92, the small and large cylindrical parts 922 and 923, and the sealing ring 93, and receives hydraulic pressure from a second oil path 175 through the second and third supply ports 914 and 927. A return spring 96 for elastically biasing the piston 92 in the +X direction is disposed inside the disengaging hydraulic pressure chamber 95. When causing the friction plate unit 105 to change from the disengaged state to the engaged state, hydraulic pressure is supplied from an output port 172 of the linear solenoid valve 107 to the engaging hydraulic pressure chamber 94 and the disengaging hydraulic pressure chamber 95 through the first oil path 174 and the second oil path 175 simultaneously.

The first surface 92A of the piston 92 receives hydraulic pressure from the disengaging hydraulic pressure chamber 95 and the second surface 92B receives hydraulic pressure from the engaging hydraulic pressure chamber 94. Here, a pressure receiving area of the second surface 92B of the piston 92 is set larger than a pressure receiving area of the first surface 92A. The small cylindrical part 922 and the large cylindrical part 923 extend continuously to the pressure receiving part 921 in this order in the −X direction. Accordingly, the disengaging hydraulic pressure chamber 95 has a small volume section 95A on the +X side (inside of the small cylindrical part 922), and a large volume section 95B on the −X side (inside of the large cylindrical part 923). The first clutch 31 is required to have a function in the disengaging hydraulic pressure chamber 95 to cancel centrifugal hydraulic pressure of the engaging hydraulic pressure chamber 94.

The operation of the first clutch 31 having the above structure is the same as the operation of the second brake 22 described in the above embodiment. For example, when hydraulic pressure is supplied to the engaging hydraulic pressure chamber 94 and the disengaging hydraulic pressure chamber 95, the piston 92 moves in the −X direction (engaging direction) by a comparatively small pushing force produced based on a pressure receiving area difference between the first and second surfaces 92A and 92B. In an early stage of the engagement, the movement of the piston 92 based on the pressure receiving area difference continues for a certain period of time. Further, when the actual engaging pressure reaches the set pressure or above, the pressure reducing valve 106 starts to the operation to limit hydraulic pressure of the disengaging hydraulic pressure chamber 95 at the set pressure and the second surface 92B of the piston 92 receives a large pushing force.

2. Second Clutch 32

Figure 16:
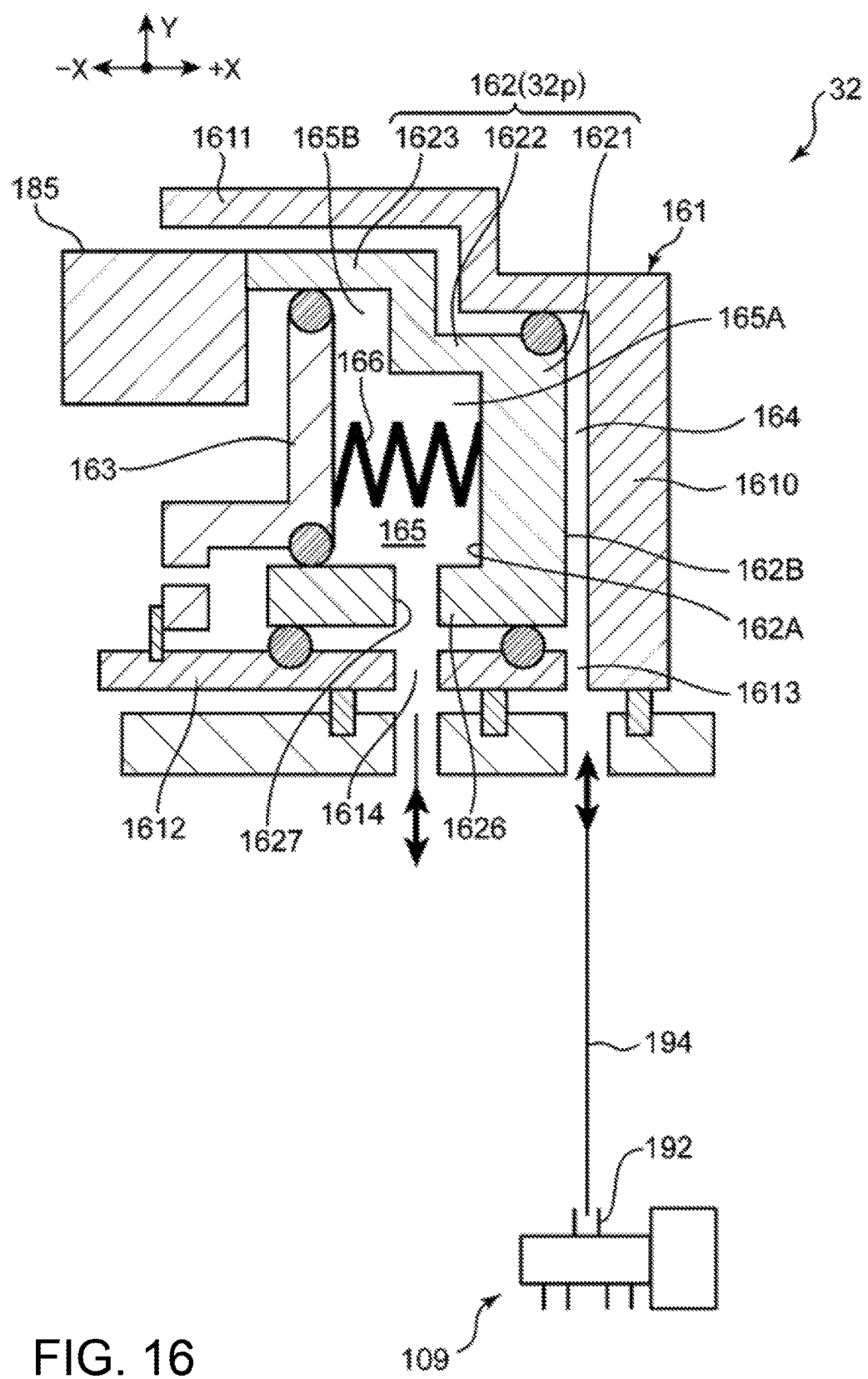
FIG. 16 is a view illustrating a schematic cross section of a structure of a second clutch which is one of the frictional engageable elements of the automatic transmission, and illustrating a part of a configuration of a hydraulic mechanism of the second clutch.

FIG. 16 is a view schematically illustrating a structure of the second clutch 32.

As illustrated in FIG. 16, the second clutch 32 includes a drum 161, a piston 162, a sealing ring 163, an engaging hydraulic pressure chamber 164 and a hydraulic pressure cancelling chamber 165. The second clutch 32 engages and disengages a friction plate unit 185. A linear solenoid valve 109 is applied as a hydraulic mechanism of the second clutch 32. The linear solenoid valve 109 has the same structure as that of the linear solenoid valve 108 of the first brake 21, and selectively supplies and discharges hydraulic pressure to and from the engaging hydraulic pressure chamber 164.

The drum 161 is supported by the transmission case 2 to be rotatable about the center axis of the automatic transmission 1. The drum 161 includes a circular plate part 1610 extending in the Y directions, an outer cylindrical part 1611 extending from a radially outer edge of the circular plate part 1610 and having a larger diameter than the circular plate part 1610, and an inner cylindrical part 1612 coaxially disposed on the inner side of the outer cylindrical part 1611. The inner cylindrical part 1612 is formed with a supply port 1613 and a communicating port 1614 for a hydraulic pressure supply.

The piston 162 is a member corresponding to the piston 32p illustrated in FIG. 1, and includes a pressure receiving part 1621, a small cylindrical part 1622, and a large cylindrical part 1623. The pressure receiving part 1621 has a third surface 162A on the friction plate unit 185 side and a fourth surface 162B on the opposite side from the third surface 162A, and the both surfaces receive hydraulic pressure.

An inner cylindrical part 1626 projects from a radially inner edge of the pressure receiving part 1621 and extends in the −X direction. The inner cylindrical part 1626 is bored a communicating port 1627 communicating with the communicating port 1614. An edge of the large cylindrical part 1623 on the −X side pushes the friction plate unit 185. The sealing ring 163 is disposed between the piston 162 and the friction plate unit 185, and blocks a gap between the large cylindrical part 1623 and the inner cylindrical part 1626.

The engaging hydraulic pressure chamber 164 (hydraulic oil pressure chamber) is space between (the fourth surface 162B side of) the pressure receiving part 1621 of the piston 162 and the circular plate part 1610 of the drum 161, and receives hydraulic pressure from a third oil path 194 supplied from an output port 192 of the linear solenoid valve 109 through the supply port 1613. The hydraulic pressure cancelling chamber 165 (centrifugal balance hydraulic pressure chamber) is space defined by (the third surface 162A side of) the pressure receiving part 1621 of the piston 162, the small and large cylindrical parts 1622 and 1623, and the sealing ring 163, and cancels centrifugal hydraulic pressure produced in the engaging hydraulic pressure chamber 164 in the disengaged state.

A return spring 166 for elastically biasing the piston 162 in the +X direction is disposed inside the hydraulic pressure cancelling chamber 165.

The third surface 162A of the piston 162 receives hydraulic pressure from the hydraulic pressure cancelling chamber 165 and the second surface 162B receives hydraulic pressure from the engaging hydraulic pressure chamber 164. The disengaging hydraulic pressure chamber 165 has a small volume section 165A on the +X side (inside of the small cylindrical part 1622), and a large volume section 165B on the −X side (inside of the large cylindrical part 1623).

The engaging operation of the second clutch 32 having the above structure and the control thereof are the same as those of the first brake 21 described in the above embodiment.

3. Control at the Time of Engaging Operation of First Clutch 31

A hydraulic pressure control executed by the hydraulic pressure controller 83 to engage the first clutch 31 is described with reference to FIG. 17 which is a time chart corresponding to FIG. 6 (the time chart of the hydraulic pressure control of the second brake 22). Note that FIG. 17 illustrates the engaging operation of the first clutch 31 and a disengaging operation of the third clutch 33 when shifting up from the second gear range to the third gear range.

Figure 17:
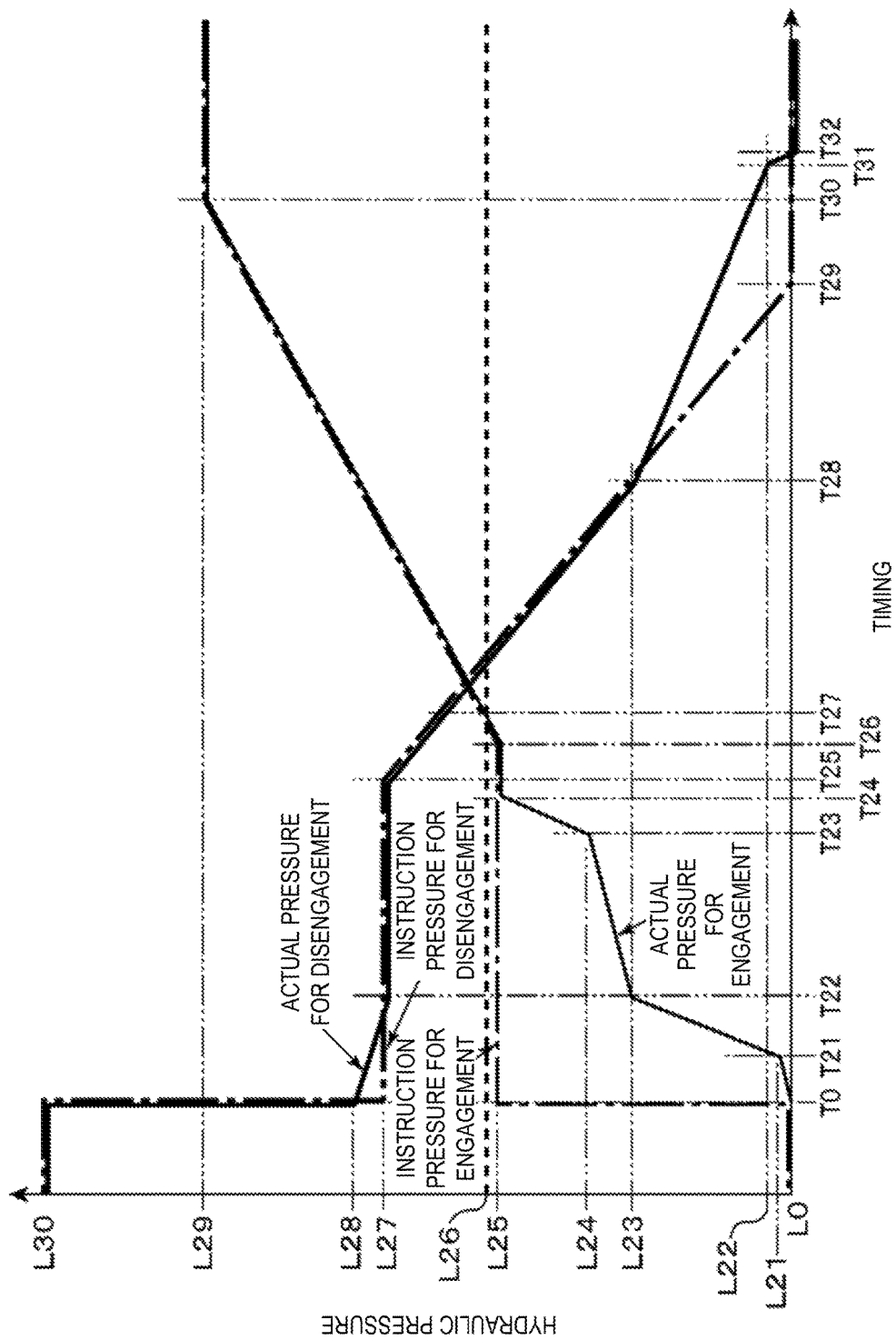
FIG. 17 is a time chart of a hydraulic pressure control executed by the hydraulic pressure controller to engage the first clutch of the automatic transmission.

As illustrated in FIG. 17, when a gear shift command is issued at a timing T0, the hydraulic pressure controller 83 instructs the linear solenoid valve 107 to output the engaging pressure at a hydraulic pressure level L25. The instruction engaging pressure is kept at the hydraulic pressure level L25 for a first period from the timing T0 to a timing T26.

Similar to the above embodiment, the actual engaging pressures in the oil paths 174 and 175 extending to the frictional engageable element gradually increase from the timing T0 to a timing T21, and increase at a sharper inclination from the timing T21 to a timing T22. Then, the actual engaging pressures gradually increase from the timing T22 to a timing T23, and then increase at a sharper inclination from the timing T23 to a timing T24. From the timing T24 to the timing T26, the actual engaging pressure is substantially the same as the hydraulic pressure level L25.

Here, the hydraulic pressure level L25 is lower than a hydraulic pressure level L26 which is a set pressure of the pressure reducing valve 106 (release pressure). Therefore, also in the engaging operation of the first clutch 31, in a first period from the timing T0 to the timing T26, the pressure reducing valve 106 does not operate and the hydraulic pressures in the engaging hydraulic pressure chamber 94 and the disengaging hydraulic pressure chamber 95 become even.

Then, in a second period from the timing T26 to a timing T30, the hydraulic pressure controller 83 instructs the linear solenoid valve 107 to increase with time the engaging pressure from the hydraulic pressure level L25 to a hydraulic pressure level L29. Note that this pressure increase in the second period is also instructed to be performed gradually from the timing T26 to the timing T30. At a timing T27 during the pressure increase, the instruction engaging pressure and the actual engaging pressure exceed the set pressure L26 of the pressure reducing valve 106. Thus, the hydraulic pressure of the disengaging hydraulic pressure chamber 95 is limited at the set pressure level L26, which causes a difference in pressure between the engaging hydraulic pressure chamber 94 and the disengaging hydraulic pressure chamber 95.

On the other hand, when the gear shift command is issued at the timing T0, the hydraulic pressure controller 83 instructs the third clutch 33 to perform the disengaging operation. For example, the hydraulic pressure controller 83 instructs the linear solenoid valve 110 of the third clutch 33 to sharply drop the engaging pressure from a hydraulic pressure level L30 to a hydraulic pressure level L27. Further the hydraulic pressure controller 83 instructs the linear solenoid valve 110 of the third clutch 33 to keep the engaging pressure at the hydraulic pressure level L27 from the timing T0 to a timing T25.

Note that as illustrated in FIG. 17, an actual engaging pressure for the disengaging operation in each oil path to the third clutch 33 sharply drops to a hydraulic pressure level L28 at the timing T0 and then gradually drops from the hydraulic pressure level L28 to the hydraulic pressure level L27 until the timing T22. From the timing T22 to the timing T25, the actual engaging pressure is kept at the hydraulic pressure level L27, which is substantially matched with the instruction pressure for the disengaging operation.

The hydraulic pressure controller 83 outputs a pressure drop command to the linear solenoid valve 110 at the timing T25 which is later than the timing T24 and earlier than the timing T26. For example, the hydraulic pressure controller 83 instructs the linear solenoid valve 110 to gradually drop the engaging pressure from the hydraulic pressure level L27 to a hydraulic pressure level L0 from the timing T25 to a timing T29.

Note that the timing T29 is earlier than the timing T30. Further the instruction pressure for the disengaging operation becomes lower than the hydraulic pressure level L26, which is the set pressure level of the pressure reducing valve 106, after the instruction pressure in the engaging operation exceeds the hydraulic pressure level L26.

Further, the actual engaging pressure for the disengaging operation in each oil path extending to the third clutch 33 after the timing T25 gradually drops along the instruction engaging pressure until a timing T28, and then further gradually drops to the hydraulic pressure level L22 from the timing T28 to a timing T31. After the timing T31, the actual engaging pressure sharply drops and reaches the hydraulic pressure level L0 at a timing T32. Thus, the operation of causing the third clutch 33 to change to the disengaged state and the first clutch 31 to the engaged state completes.

As described above, according to the automatic transmission 1 of this embodiment, also in the engaging operation of the first clutch 31 in the first period, the piston 92 is moved by the pushing force based on the pressure receiving area difference between the first and second surfaces 92A and 92B of the piston 92. Further in the second period, the engaging hydraulic pressure chamber 94 and the disengaging hydraulic pressure chamber 95 are adjusted to have different pressures so as to promptly move the piston 92. Therefore, the engaging shock is reduced without requiring a complicated hydraulic pressure control, and the engagement control time is shortened.

Further in the engaging operation of the first clutch 31, the "pre-charging process" used in the art of WO2012/144207A1 is not provided. Therefore, the time of the engagement control is shortened and the control is simplified.

Since the volume of the engaging hydraulic pressure chamber 164 of the second clutch 32 in the engaged state is smaller than that of the engaging hydraulic pressure chamber 94 of the first clutch 31 in the engaged state, the automatic transmission 1 is reduced in size.

Note that the description of the control at the time of the engaging operation of the second clutch 32 is omitted since it is substantially the same as the control at the time of the engaging operation of the first brake 21.

Modifications

In the above embodiments, the planetary-gear-type automatic transmission is described as an example; however, the present invention is not limited to this. For example, the present invention may be applied to a Continuously Variable Transmission (CVT) and a Dual Clutch Transmission (DCT).

In the above embodiments, in the controls at the time of the engaging operations of the second brake 22 and the first clutch 31, the given instruction pressure is instructed to the hydraulic pressure control valve (linear solenoid valve) in the first period, and to maintain it for the first period. Further the linearly increasing pressure is instructed to the hydraulic pressure control valve in the second period.

However, the present invention is not limited to this. For example, the instruction pressure in the first period may have an inclination (change with time), and the instruction pressure in the second period may increase with time in a quadratic or cubic curve manner. Note that since the first and second periods are extremely short (e.g., 100 msec. to 600 msec.), maintaining the first instruction pressure at the given value and linearly increasing with time the second instruction pressure are desirable in view of simplifying the control.

Further in the above embodiments, the first brake 21 adopted the configuration illustrated in FIG. 4 and the control including the pre-charging process is executed. Similarly, the first clutch 31 adopted the configuration illustrated in FIG. 15 and the control that does not include the pre-charging process is executed; however, the present invention is again not limited to this. The selection between the frictional engageable element adopting the control that includes the pre-charging process and the frictional engageable element adopting the control that does not include the pre-charging process may be made in comprehensive consideration of the size and manufacturing cost of the automatic transmission 1, and also required performances in terms of engaging shock reduction and responsiveness. For example, the configuration illustrated in FIG. 4 and the control which includes the pre-charging process may be employed to the first and second brakes 21 and 22, whereas the configuration illustrated in FIG. 15 and the control that does not include the pre-charging process may be adopted to the first to third clutches 31 to 33.

Further in the above embodiments, the automatic transmission which receives the drive force of the engine without using a torque converter (fluid transmitter) is described as an example; however, the present invention may be applied to an automatic transmission which receives the drive force of the engine through a torque converter.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
5, 105 Friction Plate Unit
6, 106 Pressure Reducing Valve
7, 107 Linear Solenoid Valve (First Hydraulic Pressure Control Valve)
21 First Brake (Second Frictional Engageable Element)
22 Second Brake (First Frictional Engageable Element)
24, 92 Piston (First Piston)
26, 94, 164, 213 Engaging Hydraulic Pressure Chamber (Hydraulic Oil Pressure Chamber) (First Engaging Hydraulic Pressure Chamber) (Second Engaging Hydraulic Pressure Chamber)
27, 95 Disengaging Hydraulic Pressure Chamber (First Disengaging Hydraulic Pressure Chamber)
31 First Clutch (First Frictional Engageable Element)
32 Second Clutch (Second Frictional Engageable Element)
33 Third Clutch
51 Drive Plate (Friction Plate)
52 Driven Plate (Friction Plate)
74, 174 First Oil Path
75, 175 Second Oil Path
76, 194 Third Oil Path
80 Hydraulic Mechanism
81 Oil Pump
82 Hydraulic Circuit
83 Hydraulic Pressure Controller
100 Control Unit (Control Device)
108, 109 Linear Solenoid Valve (Second Hydraulic Pressure Control Valve)
162, 212 Piston (Second Piston)
165 Hydraulic Pressure Cancelling Chamber
243, 924 Through-hole
244, 925 Pressure Ball (Restricting Mechanism)

What is claimed is:

1. A method of controlling an automatic transmission including a first frictional engageable element, a second frictional engageable element, and a hydraulic mechanism,
the first frictional engageable element including:
a first piston having a first surface and a second surface opposite from each other in axial directions of the first piston, and movable in the axial directions;
a plurality of first friction plates disposed on the first surface side of the first piston;
a first engaging hydraulic pressure chamber for applying hydraulic pressure to the second surface of the first piston and directing the first piston to an engaging position to push the first friction plates to be engaged with each other to be in an engaged state; and
a first disengaging hydraulic pressure chamber for applying hydraulic pressure to the first surface of the first piston and directing the first piston to a disengaging position to cause the first friction plates to be in a disengaged state, the second surface having a larger area for receiving hydraulic pressure than an area of the first surface for receiving hydraulic pressure,
the second frictional engageable element including:
a second piston having a third surface and a fourth surface opposite from each other in axial directions of the second piston, and movable in the axial directions;
a plurality of second friction plates disposed on the third surface side of the second piston; and
a second engaging hydraulic pressure chamber for applying hydraulic pressure to the fourth surface of the second piston and directing the second piston to an engaging position to push the second friction plates to be engaged with each other,
the hydraulic mechanism including:
a first hydraulic pressure control valve having an output port of hydraulic pressure, and for supplying and discharging hydraulic pressure to and from the first engaging hydraulic pressure chamber and the first disengaging hydraulic pressure chamber;
a first oil path communicating the output port of the first hydraulic pressure control valve with the first engaging hydraulic pressure chamber;
a second oil path communicating the output port with the first disengaging hydraulic pressure chamber;
a second hydraulic pressure control valve having an output port of hydraulic pressure, and for selectively supplying and discharging hydraulic pressure to and from the second engaging hydraulic pressure chamber; and
a third oil path communicating the output port of the second hydraulic pressure control valve with the second engaging hydraulic pressure chamber,
the method comprising:
controlling the first friction plates to change from the disengaged state to the engaged state in response to a gear shift command, the controlling the first friction plates including controlling the first hydraulic pressure control valve to:
adjust the hydraulic pressure to a given value in a first period in response to the gear shift command; and
increase the hydraulic pressure until the first friction plates reach the engaged state in a second period directly following the first period; and
controlling the second friction plates to change from the disengaged state to the engaged state in response to a gear shift command, the controlling the second friction plates including controlling the second hydraulic pressure control valve to:
pre-charge the second engaging hydraulic pressure chamber in response to the gear shift command by supplying hydraulic pressure at a highest target value;
maintain the hydraulic pressure at a lower value than the highest target value immediately after the pre-charging the second engaging hydraulic pressure chamber; and
increase the hydraulic pressure until the second friction plates reach the engaged state immediately after the maintaining the hydraulic pressure, a time length of the first period being shorter than a time length between a start of the pre-charging the second engaging hydraulic pressure chamber and a start of the increasing the hydraulic pressure, wherein
the hydraulic pressure in the first period is maintained at the given value,
the second oil path is provided with a pressure reducing valve for preventing the hydraulic pressure inside the first disengaging hydraulic pressure chamber from exceeding a preset value, and
in adjusting the hydraulic pressure, the pressure reducing valve reduces the hydraulic pressure at the given value to be lower than the preset value.

2. The method of claim 1, wherein the first piston is formed with a through-hole communicating the first engaging hydraulic pressure chamber with the first disengaging hydraulic pressure chamber.

3. The method of claim 2, wherein a restricting mechanism for restricting an oil flow between the first engaging hydraulic pressure chamber and the first disengaging hydraulic pressure chamber is disposed in the through-hole.

4. The method of claim 3, wherein a volume of the second engaging hydraulic pressure chamber in the engaged state is smaller than that of the first engaging hydraulic pressure chamber in the engaged state.

5. The method of claim 1, wherein a first period change of the hydraulic pressure in adjusting the hydraulic pressure to the given value in the first period is changed more gradually than a second period change of hydraulic pressure in the second period where the hydraulic pressure is increased.

6. The method of claim 5, wherein
the second oil path is provided with a pressure reducing valve for preventing the hydraulic pressure inside the first disengaging hydraulic pressure chamber from exceeding a preset value, and
in adjusting the hydraulic pressure, the pressure reducing valve reduces the hydraulic pressure at the given value to be lower than the preset value.

7. The method of claim 6, wherein the first piston is formed with a through-hole communicating the first engaging hydraulic pressure chamber with the first disengaging hydraulic pressure chamber.

8. The method of claim 7, wherein a restricting mechanism for restricting an oil flow between the first engaging hydraulic pressure chamber and the first disengaging hydraulic pressure chamber is disposed in the through-hole.

9. The method of claim 8, wherein a volume of the second engaging hydraulic pressure chamber in the engaged state is smaller than that of the first engaging hydraulic pressure chamber in the engaged state.

10. A method of controlling an automatic transmission including a first frictional engageable element, a second frictional engageable element, and a hydraulic mechanism, the first frictional engageable element including:
   a first piston having a first surface and a second surface opposite from each other in axial directions of the first piston, and movable in the axial directions;
   a plurality of first friction plates disposed on the first surface side of the first piston;
   a first engaging hydraulic pressure chamber for applying hydraulic pressure to the second surface of the first piston and directing the first piston to an engaging position to push the first friction plates to be engaged with each other to be in an engaged state; and
   a first disengaging hydraulic pressure chamber for applying hydraulic pressure to the first surface of the first piston and directing the first piston to a disengaging position to cause the first friction plates to be in a disengaged state, the second surface having a larger area for receiving hydraulic pressure than an area of the first surface for receiving hydraulic pressure,
the second frictional engageable element including:
   a second piston having a third surface and a fourth surface opposite from each other in axial directions of the second piston, and movable in the axial directions;
   a plurality of second friction plates disposed on the third surface side of the second piston; and
   a second engaging hydraulic pressure chamber for applying hydraulic pressure to the fourth surface of the second piston and directing the second piston to an engaging position to push the second friction plates to be engaged with each other,
the hydraulic mechanism including:
   a first hydraulic pressure control valve having an output port of hydraulic pressure, and for supplying and discharging hydraulic pressure to and from the first engaging hydraulic pressure chamber and the first disengaging hydraulic pressure chamber;
   a first oil path communicating the output port of the first hydraulic pressure control valve with the first engaging hydraulic pressure chamber;
   a second oil path communicating the output port with the first disengaging hydraulic pressure chamber;
   a second hydraulic pressure control valve having an output port of hydraulic pressure, and for selectively supplying and discharging hydraulic pressure to and from the second engaging hydraulic pressure chamber; and
   a third oil path communicating the output port of the second hydraulic pressure control valve with the second engaging hydraulic pressure chamber,
the method comprising:
   controlling the first friction plates to change from the disengaged state to the engaged state in response to a gear shift command, the controlling the first friction plates including controlling the first hydraulic pressure control valve to:
      adjust the hydraulic pressure to a given value in a first period in response to the gear shift command; and
      increase the hydraulic pressure until the first friction plates reach the engaged state in a second period directly following the first period; and
   controlling the second friction plates to change from the disengaged state to the engaged state in response to a gear shift command, the controlling the second friction plates including controlling the second hydraulic pressure control valve to:
      pre-charge the second engaging hydraulic pressure chamber in response to the gear shift command by supplying hydraulic pressure at a highest target value;
      maintain the hydraulic pressure at a lower value than the highest target value immediately after the pre-charging the second engaging hydraulic pressure chamber; and
      increase the hydraulic pressure until the second friction plates reach the engaged state immediately after the maintaining the hydraulic pressure, a time length of the first period being shorter than a time length between a start of the pre-charging the second engaging hydraulic pressure chamber and a start of the increasing the hydraulic pressure, wherein
   the second oil path is provided with a pressure reducing valve for preventing the hydraulic pressure inside the first disengaging hydraulic pressure chamber from exceeding a preset value, and
   in adjusting the hydraulic pressure, the pressure reducing valve reduces the hydraulic pressure at the given value to be lower than the preset value.

11. The method of claim 10, wherein the first piston is formed with a through-hole communicating the first engaging hydraulic pressure chamber with the first disengaging hydraulic pressure chamber.

12. The method of claim 11, wherein a restricting mechanism for restricting an oil flow between the first engaging hydraulic pressure chamber and the first disengaging hydraulic pressure chamber is disposed in the through-hole.

13. The method of claim 12, wherein a volume of the second engaging hydraulic pressure chamber in the engaged state is smaller than that of the first engaging hydraulic pressure chamber in the engaged state.

14. The method of claim 1, wherein a volume of the second engaging hydraulic pressure chamber in the engaged state is smaller than that of the first engaging hydraulic pressure chamber in the engaged state.

15. A control device of an automatic transmission including a first frictional engageable element, a second frictional engageable element, and a hydraulic mechanism,
   the first frictional engageable element including:
      a first piston having a first surface and a second surface opposite from each other in axial directions of the first piston, and movable in the axial directions;
      a plurality of first friction plates disposed on the first surface side of the first piston;
      a first engaging hydraulic pressure chamber for applying hydraulic pressure to the second surface of the first piston and directing the first piston to an engaging position to push the first friction plates to be engaged with each other in an engaged state; and
      a first disengaging hydraulic pressure chamber for applying hydraulic pressure to the first surface of the first piston and directing the first piston to a disengaging position to cause the first friction plates to be in a disengaged state, the second surface having a larger area for receiving hydraulic pressure than an area of the first surface for receiving hydraulic pressure, the second frictional engageable element including:
- a second piston having a third surface and a fourth surface opposite from each other in axial directions of the second piston, and movable in the axial directions;
- a plurality of second friction plates disposed on the third surface side of the second piston; and
- a second engaging hydraulic pressure chamber for applying hydraulic pressure to the fourth surface of the second piston and directing the second piston to an engaging position to push the second friction plates to be engaged with each other, the hydraulic mechanism including:
- a first hydraulic pressure control valve having an output port of hydraulic pressure, and for supplying and discharging hydraulic pressure to and from the first engaging hydraulic pressure chamber and the first disengaging hydraulic pressure chamber;
- a first oil path communicating the output port of the first hydraulic pressure control valve with the first engaging hydraulic pressure chamber;
- a second oil path communicating the output port with the first disengaging hydraulic pressure chamber;
- a second hydraulic pressure control valve having an output port of hydraulic pressure, and for selectively supplying and discharging hydraulic pressure to and from the second engaging hydraulic pressure chamber; and
- a third oil path communicating the output port of the second hydraulic pressure control valve with the second engaging hydraulic pressure chamber, the control device including a processor configured to execute instructions to:
- control the first friction plates to change from the disengaged state to the engaged state in response to a gear shift command, by controlling the first hydraulic pressure control valve to:
  - adjust the hydraulic pressure to a given value in a first period in response to the gear shift command; and
  - increase the hydraulic pressure until the first friction plates reach the engaged state in a second period directly following the first period; and
- control the second friction plates to change from the disengaged state to the engaged state in response to a gear shift command, by controlling the second hydraulic pressure control valve to:
  - pre-charge the second engaging hydraulic pressure chamber in response to the gear shift command by supplying hydraulic pressure aiming for a highest target hydraulic pressure;
  - maintain the hydraulic pressure at a lower value than the highest target value immediately after the pre-charging the second engaging hydraulic pressure chamber; and
  - increase the hydraulic pressure until the second friction plates reach the engaged state immediately after the maintaining the hydraulic pressures, a time length of the first period being shorter than a time length between a start of the pre-charging the second engaging hydraulic pressure chamber and a start of the increasing the hydraulic pressure.

16. The control device of claim 15, wherein a first period change of the hydraulic pressure in adjusting the hydraulic pressure to the given value in the first period is more gradual than a second period change of hydraulic pressure in the second period where the hydraulic pressure is increased.

17. The control device of claim 16, wherein
the second oil path is provided with a pressure reducing valve for preventing the hydraulic pressure inside the first disengaging hydraulic pressure chamber from exceeding a preset value, and
in adjusting the hydraulic pressure, the pressure reducing valve reduces the hydraulic pressure at the given value to be lower than the preset value.

18. The control device of claim 17, wherein the first piston is formed with a through-hole communicating the first engaging hydraulic pressure chamber with the first disengaging hydraulic pressure chamber.

19. The control device of claim 18, wherein a restricting mechanism for restricting an oil flow between the first engaging hydraulic pressure chamber and the first disengaging hydraulic pressure chamber is disposed in the through-hole.

20. The control device of claim 19, wherein a volume of the second engaging hydraulic pressure chamber in the engaged state is smaller than that of the first engaging hydraulic pressure chamber in the engaged state.

* * * * *